(12) United States Patent
Son et al.

(10) Patent No.: US 10,222,645 B2
(45) Date of Patent: Mar. 5, 2019

(54) DISPLAY DEVICE

(71) Applicant: Samsung Display Co. Ltd., Yongin-si, Gyeonggi-do (KR)

(72) Inventors: Ock Soo Son, Seoul (KR); Sung In Ro, Hwaseong-si (KR); Jun Ho Song, Seongnam-si (KR); Sung Jin Kim, Seongnam-si (KR); Seung Hyun Park, Seoul (KR); Young Jin Park, Suwon-si (KR); Yeo Geon Yoon, Suwon-si (KR); Jae Hak Lee, Suwon-si (KR); Woong Ki Jeon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 83 days.

(21) Appl. No.: 15/268,070

(22) Filed: Sep. 16, 2016

(65) Prior Publication Data
US 2017/0075166 A1 Mar. 16, 2017

(30) Foreign Application Priority Data

Sep. 16, 2015 (KR) ........................ 10-2015-0130692

(51) Int. Cl.
*G02F 1/1343* (2006.01)
*G02F 1/1335* (2006.01)
(Continued)

(52) U.S. Cl.
CPC .. *G02F 1/133512* (2013.01); *G02F 1/133514* (2013.01); *G02F 1/133553* (2013.01);
(Continued)

(58) Field of Classification Search
CPC .................................................. G02F 1/134309
(Continued)

(56) References Cited

U.S. PATENT DOCUMENTS

2007/0040964 A1* 2/2007 Shohara ............ G02F 1/133345
349/106
2007/0200989 A1* 8/2007 Shinichi ............ G02F 1/133753
349/129

(Continued)

FOREIGN PATENT DOCUMENTS

JP 2006-323186 A 11/2006
JP 3983870 B2 9/2007
(Continued)

OTHER PUBLICATIONS

Mitsui et al., High Image Quality Reflective Color LCD Using Novel RGBW Technology, SID 2014 Digest, pp. 93-96.

*Primary Examiner* — Christopher Raabe
(74) *Attorney, Agent, or Firm* — Innovation Counsel LLP

(57) ABSTRACT

A display device may include a first layer, a passivation layer, and a pixel. The passivation layer may overlap the first layer and may include a first passivation portion and a second passivation portion. The pixel may include a first-color filter, a first-color-corresponding electrode, a second-color filter, and a second-color-corresponding electrode. The first-color-corresponding electrode may overlap the first-color filter and may be positioned between the first layer and the first passivation portion. The second-color-corresponding electrode may overlap the second-color filter. The second passivation portion may be positioned between the first layer and the second-color-corresponding electrode.

14 Claims, 20 Drawing Sheets

(51) Int. Cl.
G02F 1/1333 (2006.01)
G02F 1/137 (2006.01)
G02F 1/1362 (2006.01)
G02F 1/1368 (2006.01)

(52) U.S. Cl.
CPC ........ G02F 1/134336 (2013.01); *G02F 1/137* (2013.01); *G02F 1/1368* (2013.01); *G02F 1/13439* (2013.01); *G02F 1/133345* (2013.01); *G02F 1/136286* (2013.01); *G02F 2001/134345* (2013.01); *G02F 2201/121* (2013.01); *G02F 2201/123* (2013.01); *G02F 2201/40* (2013.01); *G02F 2201/52* (2013.01); *G02F 2203/02* (2013.01); *G02F 2203/04* (2013.01)

(58) Field of Classification Search
USPC .......................................................... 349/113

See application file for complete search history.

(56) References Cited

U.S. PATENT DOCUMENTS

| | | | | |
|---|---|---|---|---|
| 2009/0243971 | A1* | 10/2009 | Uehara | G02F 1/1323 345/32 |
| 2010/0066952 | A1* | 3/2010 | Tsuchiya | G02F 1/133514 349/106 |
| 2011/0085102 | A1* | 4/2011 | Kim | G02F 1/133707 349/42 |
| 2012/0194573 | A1* | 8/2012 | Yamashita | G09G 3/3614 345/690 |
| 2016/0202522 | A1* | 7/2016 | Lee | G02F 1/133514 349/106 |
| 2016/0291369 | A1* | 10/2016 | Park | G02F 1/136209 |
| 2017/0131608 | A1* | 5/2017 | Jin | G02F 1/13394 |
| 2017/0363916 | A1* | 12/2017 | Koo | G02F 1/133345 |

FOREIGN PATENT DOCUMENTS

| | | |
|---|---|---|
| JP | 2009-265240 A | 11/2009 |
| KR | 10-2010-0059448 A | 6/2010 |
| KR | 10-1547855 B1 | 8/2015 |

* cited by examiner

DISPLAY DEVICE

CROSS-REFERENCE TO RELATED APPLICATION

This application claims priority to and benefit from Korean Patent Application No. 10-2015-0130692 filed on Sep. 16, 2016 in the Korean Intellectual Property Office; the contents of the Korean Patent Application are herein incorporated by reference.

BACKGROUND

1. Field

The technical field relates to, a display device, such as a reflective display device.

2. Description of the Related Art

A display device, such as a liquid crystal display device, may include a liquid crystal display (LCD) panel for controlling light transmission and may include a backlight assembly for supplying light to the LCD panel.

A reflective liquid crystal display device may control transmission of light by reflecting natural light or ambient artificial light using a reflecting plate without requiring a separate backlight assembly. Therefore, a reflective liquid crystal display device may be lighter in weight and requires less power consumption than a conventional liquid crystal display device.

In a display device, e.g., a reflective liquid crystal display device, light blocking members may be arranged in boundary regions of pixels for preventing light leakage. Nevertheless, a large size of the light blocking members may negatively affect an aperture ratio associated with the reflective liquid crystal display device.

SUMMARY

An embodiment may be related to a display device, e.g., a reflective display device. A reflective liquid crystal display device may include a first substrate and a second substrate facing each other and including a plurality of pixels, a liquid crystal layer interposed between the first substrate and the second substrate, and a pixel electrode including a first sub-pixel electrode, a second sub-pixel electrode, a third sub-pixel electrode and a fourth sub-pixel electrode disposed in one of the plurality of pixels disposed on the first substrate, wherein the first sub-pixel electrode, the second sub-pixel electrode and the third sub-pixel electrode are disposed to be planarly spaced apart from one another, the fourth sub-pixel electrode is disposed in a spacing between each of the first sub-pixel electrode, the second sub-pixel electrode and the third sub-pixel electrode, and the fourth sub-pixel electrode is disposed on a different layer from the first sub-pixel electrode, the second sub-pixel electrode and the third sub-pixel electrode.

The first sub-pixel electrode, the second sub-pixel electrode and the third sub-pixel electrode may be disposed in a row, and the fourth sub-pixel electrode includes a first part disposed in a row-direction spacing between the first sub-pixel electrode and the second sub-pixel electrode and a second part disposed in a row-direction spacing between the second sub-pixel electrode and the third sub-pixel electrode.

When viewed in a plan view, a first sub-pixel electrode side boundary of boundaries of the fourth sub-pixel electrode and a fourth sub-pixel electrode side boundary of boundaries of the first sub-pixel electrode substantially may coincide with each other, a second sub-pixel electrode side boundary of the boundaries of the fourth sub-pixel electrode and a fourth sub-pixel electrode side boundary of the boundaries of the second sub-pixel electrode substantially coincide with each other, and a third sub-pixel electrode side boundary of the boundaries of the fourth sub-pixel electrode and a fourth sub-pixel electrode boundary of the boundaries of the third sub-pixel electrode substantially coincide with each other.

The pixel electrode may be repeatedly disposed to be spaced a predetermined distance apart from one another throughout a plurality of rows and columns, and the reflective liquid crystal display device further comprises light blocking patterns disposed in spacings between each of the pixel electrodes.

The reflective liquid crystal display device further may include a red color filter, a green color filter, a blue color filter and white color filter disposed to overlap with the first sub-pixel electrode, the second sub-pixel electrode, the third sub-pixel electrode and the fourth sub-pixel electrode, respectively, and the white color filter is disposed to overlap with the fourth sub-pixel electrode.

The first sub-pixel electrode, the second sub-pixel electrode and the third sub-pixel electrode and the pixel electrode may be rectangular in a plan view.

The first sub-pixel electrode, the second sub-pixel electrode and the third sub-pixel electrode may be disposed on the same layer.

Another embodiment may be related to a display device. A reflective liquid crystal display device may include a first substrate and a second substrate facing each other and including a plurality of pixels, a liquid crystal layer interposed between the first substrate and the second substrate, and a first pixel electrode including a first sub-pixel electrode, a second sub-pixel electrode, a third sub-pixel electrode and a fourth sub-pixel electrode disposed in one of the plurality of pixels disposed on the first substrate, wherein the first sub-pixel electrode, the second sub-pixel electrode and the third sub-pixel electrode are disposed to be planarly spaced apart from one another, and the fourth sub-pixel electrode is disposed on a different layer from the first sub-pixel electrode, the second sub-pixel electrode and the third sub-pixel electrode.

When viewed in a plan view, a first sub-pixel electrode side boundary of inner boundaries of the fourth sub-pixel electrode and boundaries of the first sub-pixel electrode substantially may coincide with each other, a second sub-pixel electrode side boundary of the inner boundaries of the fourth sub-pixel electrode and boundaries of the second sub-pixel electrode substantially coincide with each other, and a third sub-pixel electrode side boundary of the inner boundaries of the fourth sub-pixel electrode and boundaries of the third sub-pixel electrode substantially coincide with each other.

The reflective liquid crystal display device further may include a second pixel electrode disposed on a previous or following row or column adjacent to the first pixel electrode, wherein the second pixel electrode includes a fifth sub-pixel electrode, a sixth sub-pixel electrode, a seventh sub-pixel electrode and a eighth sub-pixel electrode, the fifth sub-pixel electrode, the sixth sub-pixel electrode and the seventh sub-pixel electrode are disposed to be spaced apart from one another within the eighth sub-pixel electrode, the eighth sub-pixel electrode is disposed on a different layer from the fifth sub-pixel electrode, the sixth sub-pixel electrode and the seventh sub-pixel electrode, and the fourth sub-pixel electrode and the eighth sub-pixel electrode are disposed on different layers.

A second sub-pixel electrode side boundary of outer boundaries of the first sub-pixel electrode and a first pixel electrode side boundary of outer boundaries of the second pixel electrode substantially may coincide with each other in a plan view.

The fourth sub-pixel electrode may be disposed on the same layer with the fifth sub-pixel electrode, the sixth sub-pixel electrode and the seventh sub-pixel electrode, and the eighth sub-pixel electrode is disposed on the same layer with the first sub-pixel electrode, the second sub-pixel electrode and the third sub-pixel electrode.

The reflective liquid crystal display device further may include a red color filter, a green color filter, a blue color filter and white color filter disposed to overlap with the first sub-pixel electrode, the second sub-pixel electrode, the third sub-pixel electrode and fourth sub-pixel electrode, respectively, and the white color filter is disposed to overlap with the fourth sub-pixel electrode.

The first sub-pixel electrode, the second sub-pixel electrode and the third sub-pixel electrode and the first pixel electrode may be rectangular in a plan view.

Another embodiment may be related to a display device, e.g., a reflective display device. A reflective liquid crystal display device may include a first substrate and a second substrate facing each other and including a plurality of pixels, a liquid crystal layer interposed between the first substrate and the second substrate, and a pixel electrode including a first sub-pixel electrode, a second sub-pixel electrode and a third sub-pixel electrode disposed in one of the plurality of pixels disposed on the first substrate, wherein the first sub-pixel electrode and the second sub-pixel electrode are disposed to be planarly spaced apart from one another, and the third sub-pixel electrode is disposed on a different layer from the first sub-pixel electrode and second sub-pixel electrode.

The first sub-pixel electrode and the second sub-pixel electrode may be disposed in a row, and the third sub-pixel electrode includes parts disposed in a row-direction spacing between the first sub-pixel electrode and the second sub-pixel electrode.

In a plan view, a first sub-pixel electrode side boundary of boundaries of the third sub-pixel electrode and a third sub-pixel electrode side boundary of boundaries of the first sub-pixel electrode substantially may coincide with each other, and a second sub-pixel electrode side boundary of the boundaries of the third sub-pixel electrode and a third sub-pixel electrode side boundary of boundaries of the second sub-pixel electrode substantially coincide with each other.

The pixel electrode may be repeatedly disposed to be spaced a predetermined distance apart from one another throughout a plurality of rows and columns, and the reflective liquid crystal display device further comprises light blocking patterns disposed in spacings between each of the pixel electrodes.

The first sub-pixel electrode and the second sub-pixel electrode and the pixel electrode may be rectangular in a plan view.

The first sub-pixel electrode and the second sub-pixel electrode may be disposed on the same layer.

Another embodiment may be related to a display device, e.g., a reflective display device. The display device may include a first layer, a passivation layer, and a first pixel. The passivation layer may overlap the first layer and may include a first passivation portion and a second passivation portion. The first pixel may include a first first-color filter, a first first-color-corresponding electrode, a first second-color filter, and a first second-color-corresponding electrode. The first first-color-corresponding electrode may overlap the first first-color filter and may be positioned between the first layer and the first passivation portion. The first second-color-corresponding electrode may overlap the first second-color filter. The second passivation portion may be positioned between the first layer and the first second-color-corresponding electrode. The features may be illustrated by, for example, one or more of FIGS. 1 to 18 and related description. The first layer may be illustrated by, for example, one or more of the layers 100, 112, 142, 152, 174, 300, 222, 212, and 200.

A first portion of the first second-color-corresponding electrode may abut a first boundary of the first first-color-corresponding electrode in a plan view of the display device. A second portion of the first second-color-corresponding electrode may abut a second boundary of the first first-color-corresponding electrode in the plan view of the display device. The first boundary of the first first-color-corresponding electrode may extend not parallel to the second boundary of the first first-color-corresponding electrode in the plan view of the display device. The features may be illustrated by, for example, one or more of FIGS. 1 to 18 and related description.

The passivation layer may include a third passivation portion. The first pixel may include the following elements a first third-color filter and a first third-color-corresponding electrode. The first third-color-corresponding electrode may overlap the first third-color filter and may be positioned between the first layer and the third passivation portion. The features may be illustrated by, for example, one or more of FIGS. 1 to 18 and related description.

The second passivation portion may be positioned between the first passivation portion and the third passivation portion. The features may be illustrated by, for example, one or more of FIG. 3, FIG. 6A, and FIG. 6B and related description.

A portion of the first second-color-corresponding electrode may be positioned between the first first-color-corresponding electrode and the first third-color-corresponding electrode in a plan view of the display device. The features may be illustrated by, for example, one or more of FIGS. 1 to 18 and related description.

The first second-color filter may be a white filter or a blue filter. The features may be illustrated by, for example, one or more of FIGS. 1 to 18 and related description.

The passivation layer may include a fourth passivation portion. The first pixel may include a first fourth-color filter and a first fourth-color-corresponding electrode. The first fourth-color-corresponding electrode may overlap the first fourth-color filter and may be positioned between the first layer and the fourth passivation portion. The features may be illustrated by, for example, one or more of FIGS. 1 to 14 and related description.

A boundary of the first first-color-corresponding electrode may overlap (and be identical to) a first boundary of the first second-color-corresponding electrode. A boundary of the first third-color-corresponding electrode may overlap (and be identical to) a second boundary of the first second-color-corresponding electrode. A boundary of the first fourth-color-corresponding electrode may overlap (and be identical to) a third boundary of the first second-color-corresponding electrode. The first boundary of the first second-color-corresponding electrode, the second boundary of the first second-color-corresponding electrode, and the third boundary of the first second-color-corresponding electrode may be spaced from one another. The features may be illustrated by, for example, one or more of FIGS. 1 to 14 and related description.

The second boundary of the first second-color-corresponding electrode may be positioned between the first boundary of the first second-color-corresponding electrode and the third boundary of the first second-color-corresponding electrode. The features may be illustrated by, for example, one or more of FIG. 1, FIG. 4, FIG. 5, FIG. 8, FIG. 9, FIG. 10, FIG. 11, and FIG. 12 and related description.

The third boundary of the first second-color-corresponding electrode may be perpendicular to each of the first boundary of the first second-color-corresponding electrode and the second boundary of the first second-color-corresponding electrode in a plan view of the display device. The features may be illustrated by, for example, one or more of FIG. 13 and FIG. 14 and related description.

A first portion of the first second-color-corresponding electrode may be positioned between the first first-color-corresponding electrode and the first third-color-corresponding electrode in a plan view of the display device. A second portion of the first second-color-corresponding electrode may be positioned between the first third-color-corresponding electrode and the first fourth-color-corresponding electrode in the plan view of the display device. The first third-color-corresponding electrode may be positioned between the first portion of the first second-color-corresponding electrode and the second portion of the first second-color-corresponding electrode. The features may be illustrated by, for example, one or more of FIG. 1, FIG. 4, FIG. 5, FIG. 8, FIG. 9, FIG. 10, FIG. 11, and FIG. 12 and related description.

A first portion of the first second-color-corresponding electrode may be positioned between the first first-color-corresponding electrode and the first third-color-corresponding electrode in a plan view of the display device. A second portion of the first second-color-corresponding electrode may be positioned between the first first-color-corresponding electrode and the first fourth-color-corresponding electrode in the plan view of the display device. The first portion of the first second-color-corresponding electrode may extend not parallel to the second portion of the first second-color-corresponding electrode in the plan view of the display device. The features may be illustrated by, for example, one or more of FIG. 13 and FIG. 14 and related description.

The display device may include a light-blocking member. The light-blocking member may include a first light-blocking section and a second light-blocking section. The first light-blocking section may be directly connected to the second light-blocking section, may extend not parallel to the second light-blocking section, and may be positioned between the second light-blocking section and the first portion of the first second-color-corresponding electrode in the plan view of the display device. The second light-blocking section may be substantially aligned with the first portion of the first second-color-corresponding electrode in the plan view of the display device. The features may be illustrated by, for example, FIG. 14 and related description.

The light-blocking member may include a third light-blocking section. The third light-blocking section may be directly connected the first light-blocking section. The first first-color-corresponding electrode may be positioned between the third light-blocking section and the first portion of the first second-color-corresponding electrode in the plan view of the display device. The first first-color-corresponding electrode may be positioned between the first light-blocking section and the second portion of the first second-color-corresponding electrode in the plan view of the display device. The features may be illustrated by, for example, FIG. 14 and related description.

The display device may include a second pixel. The second pixel may immediately neighbor the first pixel. The passivation layer may include a fourth passivation portion, a fifth passivation portion, and a sixth passivation portion. The second pixel may include a second first-color filter, a second first-color-corresponding electrode, a second second-color filter, a second second-color-corresponding electrode, a second third-color filter, and a second third-color-corresponding electrode. The second first-color-corresponding electrode may overlap the second first-color filter. The fourth passivation portion may be positioned between the first layer and the second first-color-corresponding electrode. The second second-color-corresponding electrode may overlap the second second-color filter and may be positioned between the first layer and the fifth passivation portion. The second third-color-corresponding electrode may overlap the second third-color filter. The sixth passivation portion may be positioned between the first layer and the second third-color-corresponding electrode. The features may be illustrated by, for example, one or more of FIG. 5, FIG. 6A, FIG. 6B, FIG. 7, and FIG. 8 and related description.

A first portion of the first second-color-corresponding electrode and a first portion of the second second-color-corresponding electrode may be positioned between the first first-color-corresponding electrode and the second first-color-corresponding electrode in a plan view of the display device. A second portion of the first second-color-corresponding electrode may be positioned between the first first-color-corresponding electrode and the first third-color-corresponding electrode in the plan view of the display device. A second portion of the second second-color-corresponding electrode may be positioned between the second first-color-corresponding electrode and the second third-color-corresponding electrode in the plan view of the display device. The features may be illustrated by, for example, one or more of FIG. 5, FIG. 8, and FIG. 12 and related description.

The passivation layer may include a fourth passivation portion and a fifth passivation portion. The first pixel may include a second first-color filter, a second first-color-corresponding electrode, a second third-color filter, and a second third-color-corresponding electrode. The second first-color-corresponding electrode may be spaced from the first first-color-corresponding electrode, may overlap the second first-color filter, and may be positioned between the first layer and the fourth passivation portion. The second third-color-corresponding electrode may be spaced from the first third-color-corresponding electrode, may overlap the second third-color filter and may be positioned between the first layer and the fifth passivation portion. The features may be illustrated by, for example, one or more of FIG. 9 and FIG. 10 and related description.

A first portion of the first second-color-corresponding electrode may be positioned between the first first-color-corresponding electrode and the second first-color-corresponding electrode in a plan view of the display device. A second portion of the first second-color-corresponding electrode may be positioned between the first first-color-corresponding electrode and the first third-color-corresponding electrode in the plan view of the display device. A third portion of the first second-color-corresponding electrode may be positioned between the second first-color-corresponding electrode and the second third-color-corresponding electrode in the plan view of the display device. The features may be illustrated by, for example, one or more of FIG. 9 and FIG. 10 and related description.

The display device may include a light-blocking member. The light-blocking member may include a first light-blocking section and a second light-blocking section. The first light-blocking section may extend not parallel to the second light-blocking section in the plan view of the display device. The first first-color-corresponding electrode may be positioned between the first light-blocking section and the first portion of the first second-color-corresponding electrode in the plan view of the display device. The first first-color-corresponding electrode may be positioned between the second light-blocking section and the second portion of the first second-color-corresponding electrode in the plan view of the display device. The features may be illustrated by, for example, FIG. 10 and related description.

The display device may include a second pixel. The second pixel may immediately neighbor the first pixel. The passivation layer may include a sixth passivation portion and a seventh passivation portion. The second pixel may include a third first-color filter, a third first-color-corresponding electrode, a second second-color filter, and a second second-color-corresponding electrode. The third first-color-corresponding electrode may overlap the third first-color filter. The sixth passivation portion may be positioned between the first layer and the third first-color-corresponding electrode. The second second-color-corresponding electrode may overlap the second second-color filter and may be positioned between the first layer and the seventh passivation portion. The features may be illustrated by, for example, one or more of FIG. 11 and FIG. 12 and related description.

The first second-color-corresponding electrode may surround the first first-color-corresponding electrode, the first third-color-corresponding electrode, the second first-color-corresponding electrode, and the second third-color-corresponding electrode in a plan view of the display device. The second second-color-corresponding electrode may surround the third first-color-corresponding electrode in the plan view of the display device. The features may be illustrated by, for example, FIG. 12 and related description.

The display device may include a transistor and a light-blocking member. The transistor may include a source electrode and a drain electrode. The drain electrode may be spaced from the source electrode. A side of the drain electrode may directly contact a contact portion of the first first-color-corresponding electrode. The contact portion of the first first-color-corresponding electrode may be positioned between the side of the drain electrode and the light-blocking member in a direction perpendicular to the side of the drain electrode. The features may be illustrated by, for example, FIG. 2A and FIG. 2B and related description.

The first first-color-corresponding electrode may be positioned between the first first-color filter and the first passivation portion. The second passivation portion may be positioned between the first second-color filter and the first second-color-corresponding electrode. The features may be illustrated by, for example, one or more of FIG. 2A, FIG. 2B, FIG. 3, FIG. 6A, and FIG. 6B and related description.

According to an embodiment, a display device, e.g., a reflective liquid crystal display device, may include the following elements: a first substrate and a second substrate facing each other; a liquid crystal layer interposed between the first substrate and the second substrate; a passivation layer overlapping the liquid crystal layer and including a first passivation surface and a second passivation surface; and a pixel including a portion of the liquid crystal layer, a first sub-pixel electrode, a second sub-pixel electrode, a third sub-pixel electrode, and a fourth sub-pixel electrode disposed on one of the plurality of pixels disposed on the first substrate. The first sub-pixel electrode, the second sub-pixel electrode, and the third sub-pixel electrode all directly contact the first passivation surface and are spaced from one another. The fourth sub-pixel electrode includes a first portion disposed between the first sub-pixel electrode and the second sub-pixel electrode in a plan view of the display device, includes a second portion disposed between the second sub-pixel electrode and the third sub-pixel electrode in the plan view of the display device, and directly contacts the second passivation surface. Portions of the first passivation surface extend substantially parallel to portions of the second passivation surface. One of the first passivation surface and the second passivation surface is positioned between the liquid crystal layer and the other one of the first passivation surface and the second passivation surface.

According to an embodiment, a display device, e.g., a reflective liquid crystal display device, may include the following elements: a first substrate; a passivation layer overlapping the first substrate and including a first passivation surface and a second passivation surface; and a first pixel including a first sub-pixel electrode, a second sub-pixel electrode, a third sub-pixel electrode, and a fourth sub-pixel electrode. The first sub-pixel electrode, the second sub-pixel electrode, and the third sub-pixel electrode all directly contact the first passivation surface and are spaced from one another. The fourth sub-pixel electrode directly contacts the second passivation surface. Portions of the first passivation surface extend substantially parallel to portions of the second passivation surface. One of the first passivation surface and the second passivation surface is positioned between the first substrate and the other one of the first passivation surface and the second passivation surface.

According to still an embodiment, a display device, e.g., a reflective liquid crystal display device, may include the following elements: a first substrate; a passivation layer overlapping the first substrate and including a first passivation surface and a second passivation surface; and a pixel including a first sub-pixel electrode, a second sub-pixel electrode, and a third sub-pixel electrode. The first sub-pixel electrode and second sub-pixel electrode both directly contact the first passivation surface and are spaced from each other. The third sub-pixel electrode directly contacts the second passivation surface. Portions of the first passivation surface extend substantially parallel to portions of the second passivation surface. One of the first passivation surface and the second passivation surface is positioned between the first substrate and the other one of the first passivation surface and the second passivation surface.

According to embodiments, an aperture ratio associated with a display device can be maximized by minimizing the size of a light blocking member. In the display device, a portion of a white filter or a blue filter (and a portion of the corresponding sub-pixel electrode) may be positioned between a red filter (and the corresponding sub-pixel electrode) and a green filter (and the corresponding sub-pixel electrode). Therefore, color mixing may be minimized or substantially prevented. Advantageously, satisfactory image quality associated with the display device may be attained.

BRIEF DESCRIPTION OF THE DRAWINGS

Each of FIG. 9, FIG. 11, FIG. 13, FIG. 15.

Each of FIG. 10, FIG. 12, FIG. 14, FIG. 16.

DETAILED DESCRIPTION OF THE EMBODIMENTS

Figure 1:
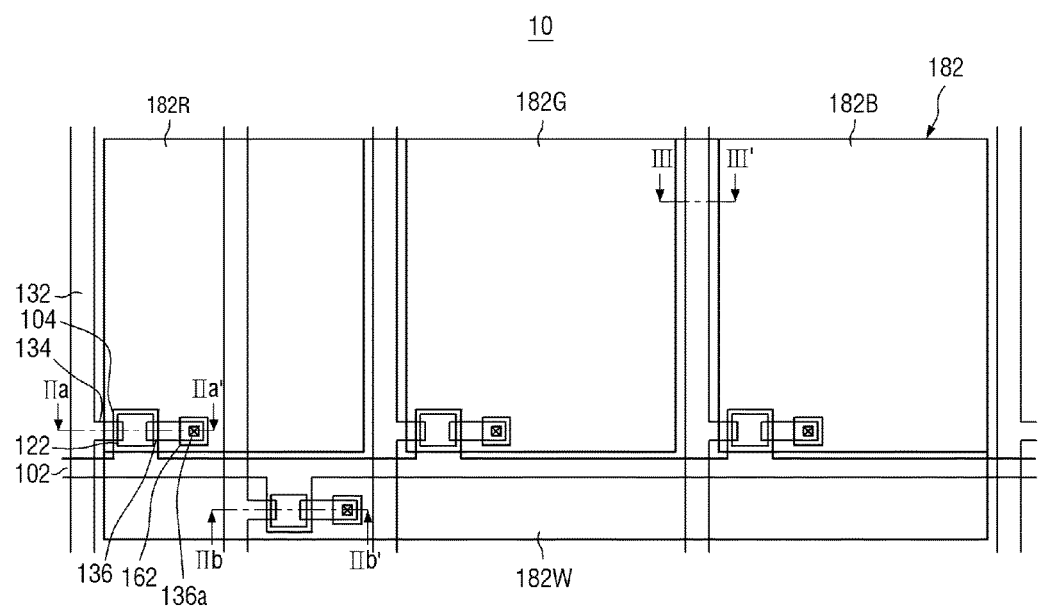
FIG. 1 illustrates a layout view (or plan view) of a pixel in a display device, e.g., a reflective liquid crystal display device, according to an embodiment.

Embodiments are described with reference to the accompanying drawings, wherein like reference numerals may refer to like elements throughout. The embodiments may have different forms and should not be construed as being limited to the descriptions set forth herein.

Although the terms "first", "second", etc. may be used herein to describe various elements, these elements should not be limited by these terms. These terms may be used to distinguish one element from another element. Thus, a first element recited in this application may be termed a second element without departing from embodiments. The description of an element as a "first" element may not require or imply the presence of a second element or other elements. The terms "first", "second", etc. may also be used to differentiate different categories or sets of elements. For conciseness, the terms "first", "second", etc. may represent "first-category (or first-set)", "second-category (or second-set)", etc., respectively.

The description that first element is connected to or coupled to a second element includes both a case where the first element is directly connected to the second element and a case where an intervening element is interposed between the first element and the second element. However, the description that a first element is directly connected or directly coupled to a second element indicates that there is no intervening element intended between the first element and the second element. The term "and/or" includes any and all combinations of one or more of the associated items.

A singular expression in the present specification also includes a plural expression. The terms "comprise" and/or "comprising" do not exclude the possibility of existence or addition of one or more other components, steps, operations, and/or devices.

The term "connect" may mean "electrically connect". The term "insulate" may mean "electrically insulate". The term "conductive" may mean "electrically conductive".

The term "electrically connected" may mean "electrically connected without any intervening transistors".

The term "conductive" may mean "electrically conductive". The term "insulating" may mean "electrically insulating". The term "conductor" may mean "electrically conductive member". The term "insulator" may mean "electrically insulating member". The term "dielectric" may mean "dielectric member". The term "interconnect" may mean "interconnecting member". The term "provide" may mean "provide and/or form". The term "form" may mean "provide and/or form".

Figure 2A:
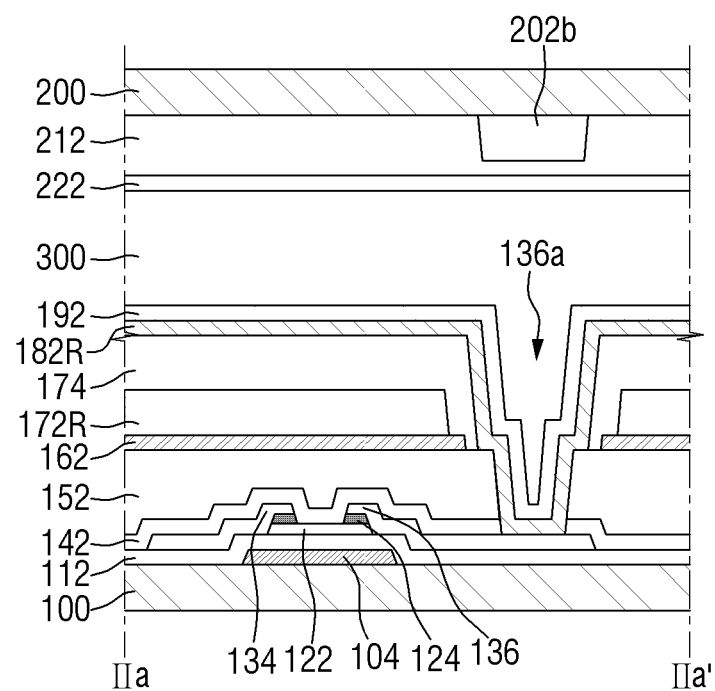
FIG. 2A and FIG. 2B illustrates cross-sectional views taken along lines IIa-IIa' and IIb-IIb' of FIG. 1.
Figure 2B:
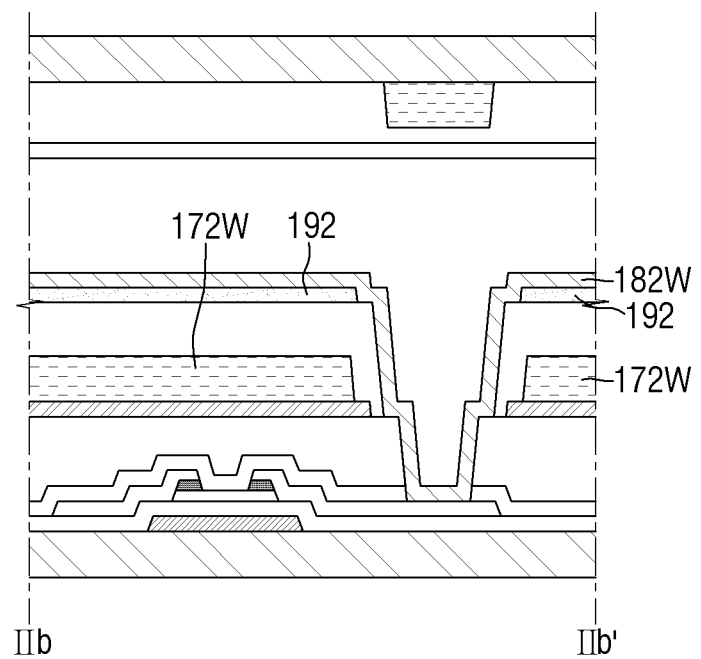
Figure 3:
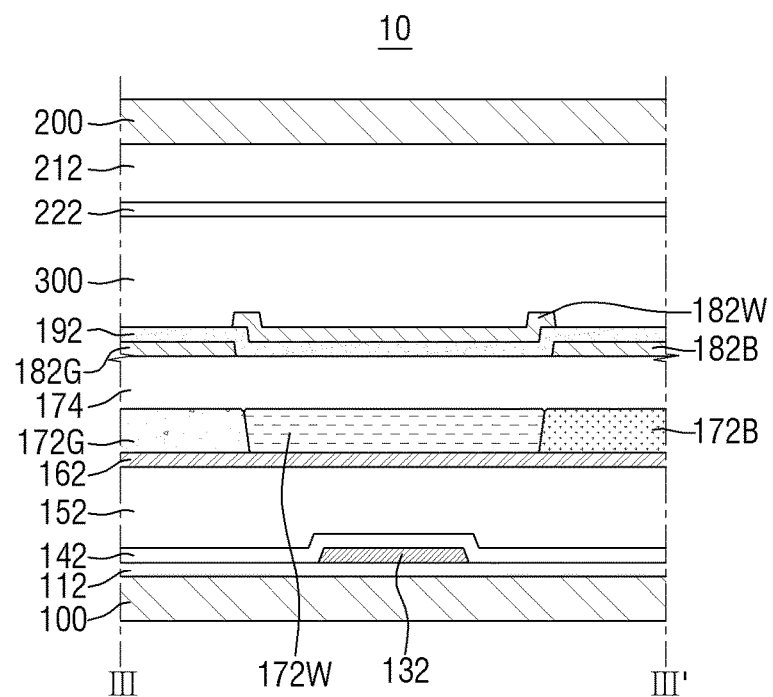
FIG. 3 illustrates a cross-sectional view taken along the line of FIG. 1.
Figure 4:
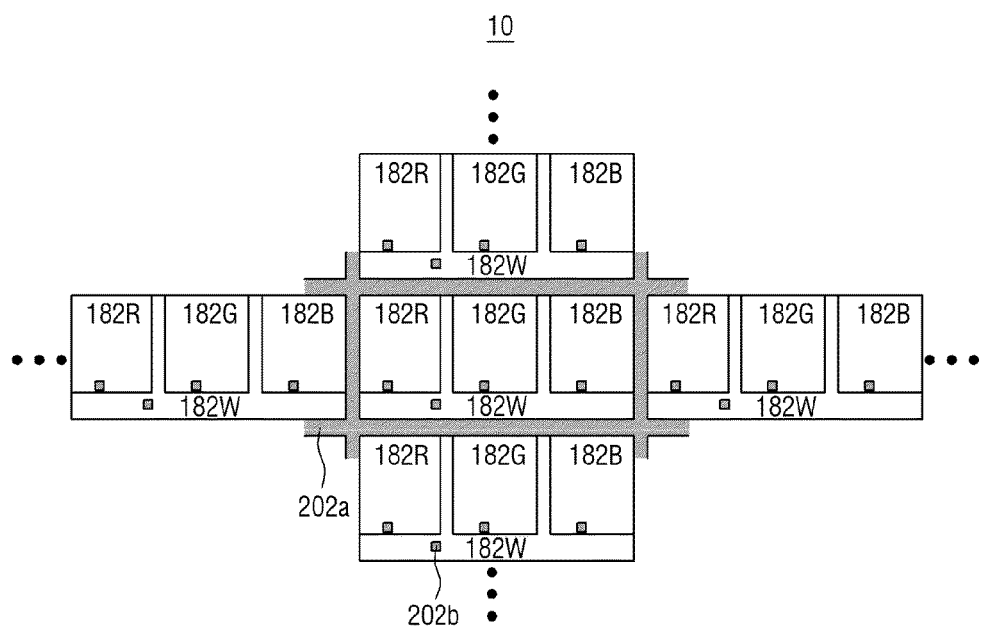
FIG. 4 illustrates a plan view for explaining pixel electrodes and light blocking members in the display device associated with FIG. 1.

FIG. 1 illustrates a layout view (or plan view) of a pixel in a display device, e.g., a reflective liquid crystal display device, according to an embodiment. FIG. 2A and FIG. 2B illustrates cross-sectional views taken along lines IIa-IIa' and IIb-IIb' of FIG. 1. FIG. 3 illustrates a cross-sectional view taken along the line of FIG. 1. FIG. 4 illustrates a plan view for explaining pixel electrodes and light blocking members in the display device associated with FIG. 1.

Referring to FIGS. 1 to 4, the reflective liquid crystal display device 10 according to an embodiment includes a first substrate 100 and a second substrate 200 facing each other, and a liquid crystal layer 300 interposed between the first substrate 100 and the second substrate 200.

Each of the first substrate 100 and the second substrate 200 may include an insulating material, such as transparent glass, quartz, ceramic, silicon or a transparent plastic material, and may be appropriately selected as needed by one skilled in the art. The first substrate 100 and the second substrate 200 may be disposed to face each other.

In some embodiments, the first substrate 100 and the second substrate 200 may have flexibility. That is to say, the first substrate 100 and the second substrate 200 may be substrates capable of transforming by rolling, folding, or bending.

A plurality of gate wires 102 and 104 and a plurality of data wires 132, 134 and 136 may be disposed on the first substrate 100.

The gate wires 102 and 104 may include a plurality of gate lines 102 and a plurality of gate electrodes 104. The data wires 132, 134 and 136 may include a plurality of data lines 132, a plurality of source electrodes 134 and a plurality of drain electrodes 136.

The gate wires 102 and 104 and the data wires 132, 134 and 136 may include an aluminum (Al) based metal, such as aluminum (Al) or an aluminum (Al) alloy, a silver based metal, such as silver (Ag) or a silver (Ag) alloy, a copper (Cu) based metal, such as copper (Cu) or a copper (Cu) alloy, a molybdenum (Mo) based metal, such as molybdenum (Mo) or a molybdenum (Mo) alloy, chrome (Cr, titanium (Ti, or tantalum (Ta). In addition, the gate wires 102 and 104 and the data wires 132, 134 and 136 may have a multi-layer structure including two conductive layers (not shown) that may have different physical properties. For example, one conductive layer may be made of an aluminum (Al) based metal, a silver (Ag) based metal or a copper (Cu) based metal and the other conductive layer may be made of a Mo based metal, Cr, Ti or Ta, or combinations thereof. Examples of the combinations may include a combination of a Cr lower layer and an Al upper layer and a combination of an Al lower layer and an Mo upper layer, but aspects are not limited thereto. The gate wires 102 and 104 and the data wires 132, 134 and 136 may be made of various metals and conductive materials.

The gate lines 102 may extend in a first direction, for example, in a horizontal direction and the data lines 132 may extend in a second direction, for example, in a vertical direction.

In the reflective liquid crystal display device 10 according to an embodiment, a unit pixel may be defined by a pixel electrode 182 to be described later. The pixel electrode 182 may include a plurality of sub-pixel electrodes 182R, 182G, 182B and 182W, and sub-pixels may be defined by the sub-pixel electrodes 182R, 182G, 182B and 182W, respectively. The first substrate 100 and the second substrate 200 may include a plurality of pixels defined by the plurality of pixel electrodes 182.

At least one gate electrode 104 is connected to and disposed on each sub-pixel in each of the gate lines 102. The gate electrode 104 may be formed by branching from the gate line 102 to a semiconductor layer 122 or by expanding the gate line 102. However, the present invention is not limited thereto, and the gate electrode 104 may be defined on the area that overlaps the semiconductor layer 122 on the extension path of the gate line 102.

At least one source electrode 134 is connected to and disposed on each sub-pixel in each of the data lines 132. The source electrode 134 may be formed by branching from the data line 132 to the semiconductor layer 122 or by expanding the data line 132. However, the present invention is not limited thereto, and the source electrode 134 may be defined on the area that overlaps the semiconductor layer 122 on the extension path of the data line 132. The drain electrode 136 may be disposed to be spaced apart from the source electrode 104 in view of the semiconductor layer 122 and may be electrically connected to the sub-pixel electrodes 182R, 182G, 182B and 182W through a contact hole 136a formed to pass through a first passivation layer 142 and a second passivation layer 172.

A gate insulating layer 112 may be disposed between the gate wires 102 and 104 and the data wires 132, 134 and 136. In an embodiment, the gate insulating layer 112 may be disposed on the gate wires 102 and 104 and the data wires 132, 134 and 136 may be disposed on the gate insulating layer 112. The gate insulating layer 112 may be formed of, for example, silicon nitride (SiN$_x$), silicon oxide (SiO$_2$), silicon oxynitride (SiON), or a stacked layer of these materials. The gate insulating layer 112 may serve to insulate the gate wires 102 and 104 and overlying conductive films thereof, including, for example, the data line 132.

The semiconductor layer 122 may be disposed on the gate insulating layer 112 and may include, for example, hydrogenated amorphous silicon or polysilicon. The semiconductor layer 122 may be disposed such that at least a portion overlapping with the gate electrode 104. The semiconductor layer 122, the gate electrode 104, the source electrode 134 and the drain electrode 136 constitute a thin film transistor.

The semiconductor layer 122 may have various shapes, including an island shape or a line shape. FIG. 3 illustrates a case where the semiconductor layer 122 has an island shape, but aspects are not limited thereto. In a case where the semiconductor layer 122 has a line shape, although not separately shown, it may overlap with the data wires 132, 134 and 136.

The ohmic contact layer 124, including hydrogenated amorphous silicon in which an n-type impurity is highly doped, may be disposed on the semiconductor layer 122. The ohmic contact layer 124 may be positioned between the underlying semiconductor layer 122 and the overlying source electrode 134 and the drain electrode 136 thereon and may reduce contact resistance therebetween. Like the semiconductor layer 122, the ohmic contact layer 124 may also have various shapes, including an island shape or a line shape. When the semiconductor layer 122 has an island shape, the ohmic contact layer 124 may also have an island shape. When the semiconductor layer 122 has a line shape, the ohmic contact layer 124 may also have a line shape. Unlike the semiconductor layer 122, the ohmic contact layer 124 may have a spacing in which the source electrode 134 and the drain electrode 136 face each other and are spaced apart from each other, thereby exposing the underlying semiconductor layer 122. The semiconductor layer 122 may include a channel formed in the spacing in which the source electrode 134 and the drain electrode 136 face each other and are spaced apart from each other.

When the gate electrode 104 is applied with a gate-on signal to form a channel in the semiconductor layer 122, the thin film transistor is turned on. The drain electrode 136 may receive a data signal from the source electrode 134 and may transmit the data signal to the sub-pixel electrodes 182R, 182G, 182B and 182W.

The first passivation layer 142 may be disposed on the data wires 132, 134 and 136 and the exposed semiconductor layer 122. The contact hole 136a exposing at least a portion of the drain electrode 136 may be formed in the first passivation layer 142. The at least a portion of the exposed drain electrode 136 may be brought into contact with the sub-pixel electrodes 182R, 182G, 182B and 182W through the contact hole 136a. Accordingly, the drain electrode 136 and the sub-pixel electrodes 182R, 182G, 182B and 182W may be electrically connected to each other.

In some embodiments, as shown in FIGS. 1 to 3, the contact hole 136a may be implemented such that it exposes only a portion of the drain electrode 136, which is, however, provided only for illustration. The contact hole 136a may also be implemented such that it exposes a portion of the drain electrode 136 and a portion of the gate insulating layer 112.

The first passivation layer 142 may include, for example, an inorganic material, such as silicon nitride or silicon oxide, or a material formed by plasma enhanced chemical vapor deposition (PECVD), such as a-Si:C:O or a-Si:O:F.

A first organic layer 152 may be disposed on the first passivation layer 142. The first organic layer 152 may be made of a material having superior planarization characteristics and having some degrees of photosensitivity. The contact hole 136a exposing at least a portion of the drain electrode 136 may be formed in the first organic layer 152.

A reflecting layer 162 may be disposed on the first organic layer 152. The reflecting layer 162 may serve to reflect externally incident light. To this end, the reflecting layer 162 may be/include a highly reflective metal film, such as a silver (Ag) and/or aluminum (Al) metal layer, but embodiments are not limited thereto. The reflecting layer 162 may also be formed by stacking two or more metal layers or reflecting layers.

The reflecting layer 162 may include an opening for connecting each of the sub-pixel electrodes 182R, 182G, 182B and 182W to the drain electrode 136. The opening of the reflecting layer 162 may be formed at each sub-pixel so as to correspond to each of the respective sub-pixels. Each of the openings may be larger than the contact hole 136a. In this case, as shown in FIGS. 1 and 2, the contact hole 136a may be positioned within the opening formed in the reflecting layer 162. The reflecting layer 162 may be formed in a single body throughout the entire pixel region excluding the opening.

Since the reflecting layer 162 is disposed on the gate line 102 and the data line 132 and covers the gate line 102 and the data line 132, a loss in the aperture ratio due to presence of the gate line 102 and the data line 132 may not be generated or may be minimized. Accordingly, the gate line 102 and the data line 132 may be disposed on various locations without being limited by the pixel shape.

In order to prevent a voltage variation from being caused by the voltages applied to the gate line 102 and the data line 132, the reflecting layer 162 may be applied with a constant voltage. For example, since the reflecting layer 162 is electrically connected to a common electrode 222 disposed on the second substrate 200, a common voltage may be applied to the reflecting layer 162. A variety of existing methods known in the related art may be employed in electrically connecting the reflecting layer 162 and the common electrode 222 to each other, and detailed descriptions thereof will not be given.

Color filters 172R, 172G, 172B and 172W are disposed on the reflecting layer 162. The color filters 172R, 172G, 172B and 172W may include an R (red) color filter 172R, a G (green) color filter 172G, a B (blue) color filter 172B and a W (white) color filter 172W. The R, G, B and W color filters 172R, 172G, 172B and 172W may be disposed to correspond to the respective sub-pixels. That is to say, the R, G, B and W color filters 172R, 172G, 172B and 172W may be disposed to overlap with the corresponding sub-pixel electrodes 182R, 182G, 182B and 182W, respectively. Externally incident light is reflected by the reflecting layer 162. As the externally incident light is reflected after transmitting through the color filters 172R, 172G, 172B and 172W, colors corresponding to the color filters 172R, 172G, 172B and 172W may be displayed. The color filters 172R, 172G, 172B and 172W may include photosensitive organic materials including pigments.

Each of the color filters 172R, 172G, 172B and 172W may include an opening for connecting each of the sub-pixel electrodes 182R, 182G, 182B and 182W to the drain electrode 136. The opening may be larger than the contact hole 136a. In this case, the contact hole 136a may be positioned within the opening formed in each of the R, G, B and W color filters 172R, 172G, 172B and 172W. Further, the opening of each of the color filters 172R, 172G, 172B and 172W may be larger than the opening formed in the reflecting layer 162, and the opening formed in the reflecting layer 162 may be positioned within each of the color filters 172R, 172G, 172B and 172W, which is, however, provided only for illustration. However, configurations of the color filters 172R, 172G, 172B and 172W are not limited to those illustrated herein.

A second organic layer 174 may be disposed on the color filters 172R, 172G, 172B and 172W. The second organic layer 174 may be made of a material having superior planarization characteristics and having some degrees of photosensitivity. The second organic layer 174 may include an opening for connecting each of the sub-pixel electrodes 182R, 182G, 182B and 182W to the drain electrode 136. The opening may be larger than the contact hole 136a. In this case, the contact hole 136a may be positioned within the opening formed in the second organic layer 174. The second organic layer 174 may be disposed on the color filters 172R, 172G, 172B and 172W, thereby planarizing a step difference between each of the R, G, B and W color filters 172R, 172G, 172B and 172W. The second organic layer 174 may entirely cover the color filters 172R, 172G, 172B and 172W. That is to say, since the color filters 172R, 172G, 172B and 172W are covered by the second organic layer 174, they may not have exposed portions, which is, however, provided only for illustration. However, the configuration of the second organic layer 174 is not limited to that illustrated herein.

In the embodiment shown in FIG. 2A and FIG. 2B, the liquid crystal display device 10 including the second organic layer 174 is illustrated, but embodiments are not limited thereto. In embodiments, the liquid crystal display device 10 may be implemented with a structure in which the second organic layer 174 is not provided. In this case, some of the sub-pixel electrodes 182R, 182G, 182B and 182W may be directly disposed on the color filters 172R, 172G, 172B and 172W.

As shown in FIG. 2A and FIG. 2B, the second organic layer 174 may include a portion brought into direct contact with a top surface of the first organic layer 152. A portion of the top surface of the first organic layer 152 may not be covered by the second organic layer 174, as shown in FIG. 2A and FIG. 2B. In other words, each of internal surfaces of the contact hole 136a formed in the first organic layer 152 and a hole based on the opening formed in the second organic layer 174 may include a stepped portion, which is, however, provided only for illustration. The top surface of the first organic layer 152 may be entirely covered by the second organic layer 174. In addition, as long as at least a portion of the drain electrode 136 can be exposed through the contact hole 136a, the internal surface of the contact hole 136a formed in the first organic layer 152 may be entirely covered by the second organic layer 174.

The pixel electrodes 182 including the sub-pixel electrodes 182R, 182G, 182B and 182W are formed on the second organic layer 182. Some of the sub-pixel electrodes 182R, 182G, 182B and 182W are disposed within the contact hole 136a and may be brought into contact with the drain electrode 136 to then be electrically connected. Although not shown, when a portion of the drain electrode 136 and a portion of the gate insulating layer 112 are exposed by the contact hole 136a, the sub-pixel electrodes 182R, 182G, 182B and 182W may include parts brought into direct contact with the gate insulating layer 112.

If a data voltage is applied to the sub-pixel electrodes 182R, 182G, 182B and 182W, the sub-pixel electrodes 182R, 182G, 182B and 182W form an electric field together with the common electrode 222, thereby controlling alignment of liquid crystal molecules included in the liquid crystal layer 300. The sub-pixel electrodes 182R, 182G, 182B and 182W may include, but not limited to, a transparent conductive material, such as indium tin oxide (ITO) or indium zinc oxide (IZO).

Configurations of the pixel electrodes 182 will now be described in detail.

Light blocking members 202a and 202b, an overcoat layer 212 and the common electrode 222 may be disposed on the second substrate 200.

The light blocking members 202a and 202b may prevent light leakage. In some embodiments, the light blocking members 202a and 202b may be directly disposed on the second substrate 200, as shown in FIG. 2A and FIG. 2B, but embodiments are not limited thereto. The light blocking members 202a and 202b may be disposed on the common electrode 222 to be described later or may be disposed on the first substrate 100.

The light blocking members 202a and 202b may be made of a material capable of blocking transmission of incident light. The light blocking effect may be achieved by reflecting or absorbing the incident light. For example, the light blocking members 202a and 202b may be made of a highly reflective metal, such as chrome (Cr), thereby achieving the light blocking effect. In embodiments, the light blocking members 202a and 202b may be formed of an organic layer (e.g., a black organic layer) including a material, such as a black pigment or dye, to allow most of the incident light to be reflected, thereby achieving the light blocking effect. In some embodiments, the light blocking members 202a and 202b may be formed to have a stack structure of a metal layer and a black organic layer.

Configurations of the light blocking members 202a and 202b will be described in detail together with the sub-pixel electrodes 182R, 182G, 182B and 182W.

The overcoat layer 212 may be disposed on the light blocking members 202a and 202b. The overcoat layer 212 may be formed of a transparent organic layer, but embodiments are not limited thereto.

The common electrode 222 may be disposed on the overcoat layer 212. The common electrode 222 may be disposed throughout the entire pixel regions in a single body. The common electrode 222 may be made of a transparent conductive material, such as polycrystalline, single crystalline or amorphous indium tin oxide (ITO) or indium zinc oxide (IZO). The common electrode 222 may be applied with a common voltage to then form an electric field together with the sub-pixel electrodes 182R, 182G, 182B and 182W, thereby controlling alignment of liquid crystal molecules included in the liquid crystal layer 300.

The common electrode 222 may be electrically connected to reflecting layer 162. A variety of existing methods known in the related art may be employed in electrically connecting the reflecting layer 162 and the common electrode 222 to each other, and detailed descriptions thereof will not be given.

An alignment layer (not shown) may be disposed on each of one surface of the first substrate 100 facing the liquid crystal layer 300 and one surface of the second substrate 200. That is to say, the alignment layers (not shown) capable of aligning the liquid crystal layer 300 may be disposed on the sub-pixel electrodes 182R, 182G, 182B and 182W and the common electrode 222.

The liquid crystal layer 300 may be interposed between the first substrate 100 and the second substrate 200. The liquid crystal layer 300 may include liquid crystal molecules. The liquid crystal molecules may be vertically aligned mode liquid crystal molecules, which are aligned between the first substrate 100 and the second substrate 200 in a vertical direction with respect to the first substrate 100 and the second substrate 200. If the electric field is formed between first substrate 100 and the second substrate 200, the liquid crystal molecules rotate between the first substrate 100 and the second substrate 200 in a predetermined direction to thus transmit or block the light. The term "rotate" used herein may mean the liquid crystal molecules actually rotate and that alignment of the liquid crystal molecules is changed by the electric field.

Hereinafter, the configurations of the sub-pixel electrodes 182R, 182G, 182B and 182W of the liquid crystal display device 10 according to an embodiment will be described in detail.

In the reflective liquid crystal display device 10 according to an embodiment, unit pixels may be defined by the pixel electrodes 182. The pixel electrodes 182 may include a plurality of sub-pixel electrodes 182R, 182G, 182B and 182W, and sub-pixels may be defined by the sub-pixel electrodes 182R, 182G, 182B and 182W, respectively.

In some embodiments, one of the pixel electrodes 182 may include a first sub-pixel electrode 182R, a second sub-pixel electrode 182G, a third sub-pixel electrode 182B and a fourth sub-pixel electrode 182W.

In some embodiments, when viewed in a plan view, the first sub-pixel electrode 182R may be disposed to overlap with the R color filter 172R, the second sub-pixel electrode 182G may be disposed to overlap with the G color filter 172G, the third sub-pixel electrode 182B may be disposed to overlap with the blue color filter 172B, and the fourth sub-pixel electrode 182W may be disposed to overlap with the white color filter 172W.

The first sub-pixel electrode 182R, the second sub-pixel electrode 182G and the third sub-pixel electrode 182B may be disposed to be planarly spaced apart from one another. For example, as in the embodiments shown in FIGS. 1 and 3, the first sub-pixel electrode 182R, the second sub-pixel electrode 182G and the third sub-pixel electrode 182B may be disposed in a row in turn. Here, the first sub-pixel electrode 182R and the second sub-pixel electrode 182G may be disposed to be spaced a predetermined distance apart from each other in a row direction (e.g., in a horizontal direction in the drawing), and the second sub-pixel electrode 182G and the third sub-pixel electrode 182B may be disposed to be spaced a predetermined distance apart from each other in a row direction (e.g., in the horizontal direction in the drawing). As the first sub-pixel electrode 182R, the second sub-pixel electrode 182G and the third sub-pixel electrode 182B are spaced apart from one another, they may be electrically insulated from one another.

In some embodiments, the first sub-pixel electrode 182R, the second sub-pixel electrode 182G and the third sub-pixel electrode 182B may be disposed on the same layer, but embodiments are not limited thereto. One of the aforementioned sub-pixel electrodes may be disposed on a different layer from the other sub-pixel electrodes.

In some embodiments, as shown in FIGS. 1 and 3, the first sub-pixel electrode 182R, the second sub-pixel electrode 182G and the third sub-pixel electrode 182B are rectangular when viewed in the plan view, but embodiments are not limited thereto.

In some embodiments, when viewed in the plan view, the first sub-pixel electrode 182R, the second sub-pixel electrode 182G and the third sub-pixel electrode 182B may have substantially equal areas.

In some embodiments, when viewed in the plan view, the first sub-pixel electrode 182R, the second sub-pixel electrode 182G, the third sub-pixel electrode 182B and the fourth sub-pixel electrode 182W may have substantially equal areas.

The fourth sub-pixel electrode 182W may be disposed in a spacing between each of the first sub-pixel electrode 182R, the second sub-pixel electrode 182G and the third sub-pixel electrode 182B.

Referring to FIGS. 1 and 3, in some embodiments, the fourth sub-pixel electrode 182W may include a first part corresponding to a portion disposed in a row-direction spacing between the first sub-pixel electrode 182R and the second sub-pixel electrode 182G and a second part corresponding to a portion disposed in a row-direction spacing between the second sub-pixel electrode 182G and the third sub-pixel electrode 182B.

In addition, as shown in FIG. 1, the fourth sub-pixel electrode 182W may include a third part corresponding to a row-direction extending portion in one side (e.g., in a column direction) of each of the first sub-pixel electrode 182R, the second sub-pixel electrode 182G and the third sub-pixel electrode 182B. The third part may be connected to the first part and the second part to then be implemented in a single body.

Although not shown, the fourth sub-pixel electrode 182W may further include a fourth part corresponding to a row-direction extending portion in the other side (e.g., in the opposite side of the one side) of each of the first sub-pixel electrode 182R, the second sub-pixel electrode 182G and the third sub-pixel electrode 182B. The first to fourth parts may be connected to one another to then be implemented in a single body.

The fourth sub-pixel electrode 182W may be disposed on a different layer from the first sub-pixel electrode 182R, the second sub-pixel electrode 182G and the third sub-pixel electrode 182B.

In some embodiments, a second passivation layer 192 may be disposed between of the first sub-pixel electrode 182R, the second sub-pixel electrode 182G and between the third sub-pixel electrode 182B and the fourth sub-pixel electrode 182W. The fourth sub-pixel electrode 182W may be disposed on a different layer from the first sub-pixel electrode 182R, the second sub-pixel electrode 182G and the third sub-pixel electrode 182B by the second passivation layer 192, so that it can be electrically insulated from the first sub-pixel electrode 182R, the second sub-pixel electrode 182G and the third sub-pixel electrode 182B.

The second passivation layer 192 may include, for example, an inorganic material, such as silicon nitride or silicon oxide, or a material formed by plasma enhanced chemical vapor deposition (PECVD), such as a-Si:C:O or a-Si:O:F.

Referring to FIGS. 2 and 3, in some embodiments, the first sub-pixel electrode 182R, the second sub-pixel electrode 182G and the third sub-pixel electrode 182B may be disposed under the second passivation layer 192, and the fourth sub-pixel electrode 182W may be disposed on the second passivation layer 192. In this case, the second passivation layer 192 may include an opening for connecting the fourth sub-pixel electrode 182W to the drain electrode 136, as shown in FIG. 2A and FIG. 2B, but not limited thereto. Rather, the fourth sub-pixel electrode 182W may be disposed under the second passivation layer 192, and the first sub-pixel electrode 182R, the second sub-pixel electrode 182G and the third sub-pixel electrode 182B may be disposed on the second passivation layer 192.

In some embodiments, the second passivation layer 192 may be disposed throughout the entire pixel region, but embodiments are not limited thereto. That is to say, the second passivation layer 192 may be implemented such that it has members having various shapes, as long as the fourth sub-pixel electrode 182W can be electrically insulated from the first sub-pixel electrode 182R, the second sub-pixel electrode 182G and the third sub-pixel electrode 182B.

A first sub-pixel electrode side boundary of boundaries of the fourth sub-pixel electrode 182W and a fourth sub-pixel electrode side boundary of boundaries of the first sub-pixel electrode 182R may substantially coincide/overlap with each other, when viewed in a plan view.

Likewise, a second sub-pixel electrode side boundary of the boundaries of the fourth sub-pixel electrode 182W and a fourth sub-pixel electrode side boundary of boundaries of the second sub-pixel electrode 182G may substantially coincide/overlap with each other, when viewed in the plan view.

Similarly, a third sub-pixel electrode side boundary of the boundaries of the fourth sub-pixel electrode 182W and a fourth sub-pixel electrode boundary of the boundaries of the third sub-pixel electrode 182B may substantially coincide/overlap with each other, when viewed in the plan view.

Accordingly, when a pixel is viewed in the plan view, no spacing may practically exist between each of the sub-pixel electrodes 182R, 182G, 182B and 182W. That is to say, the pixel includes a plurality of sub-pixel electrodes 182R, 182G, 182B and 182W electrically insulated from one another but may be configured to be continuously arranged without a spacing, when viewed in the plan view.

With this configuration, when viewed in the plan view, the sub-pixel electrodes 182R, 182G, 182B and 182W are seamlessly arranged even in the boundaries between each of the sub-pixel electrodes 182R, 182G, 182B and 182W, alignment of the liquid crystal molecules can be easily controlled in the boundaries without installing separate light blocking members in the boundaries. Therefore, with this configuration without light blocking members, the aperture ratio can be enhanced, compared to a configuration in which a spacing exists between the sub-pixel electrodes and a light blocking member is disposed in the spacing.

In some embodiments, the pixel electrode 182 including the plurality of sub-pixel electrodes 182R, 182G, 182B and 182W may be rectangular when viewed in a plan view, which is, however, provided only for illustration. However, the plan-view shape of the pixel electrode 182 is not limited to the rectangular shape, as illustrated herein.

In some embodiments, the pixel electrodes 182 including the plurality of sub-pixel electrodes 182R, 182G, 182B and 182W may be repeatedly disposed to be spaced a predetermined distance apart from each other throughout a plurality of rows and columns, as shown in FIG. 4.

The light blocking members 202a and 202b may include a first light blocking member 202a and a second light blocking member 202b. The first light blocking member 202a may be disposed in the spacing between the pixel electrodes 182. That is to say, the reflective liquid crystal display device 10 according to an embodiment includes a first pixel electrode including the plurality of sub-pixel electrodes 182R, 182G, 182B and 182W and a plurality of other pixel electrodes disposed to be spaced a predetermined distance apart from a previous and/or following row and/or column adjacent to the first pixel electrode, and the first light blocking member 202a may be disposed in a spacing between the first pixel electrode and each of the plurality of other pixel electrodes. In some embodiments, since it is not easy to control a voltage applied to liquid crystal molecules positioned in the contact hole 136a, the second light blocking member 202b may be disposed at a position corresponding to the contact hole 136a.

In the embodiment shown in FIGS. 1 to 4, the fourth sub-pixel electrode 182W disposed to correspond to the white color filter 172W is disposed in the spacing between each of the first to third sub-pixel electrodes 182R, 182G and 182B, but embodiments are not limited thereto. In embodiments, a sub-pixel electrode disposed to correspond to another color filter other than the white color filter 172W may be disposed in the spacing between each of the other sub-pixel electrodes.

Figure 5:
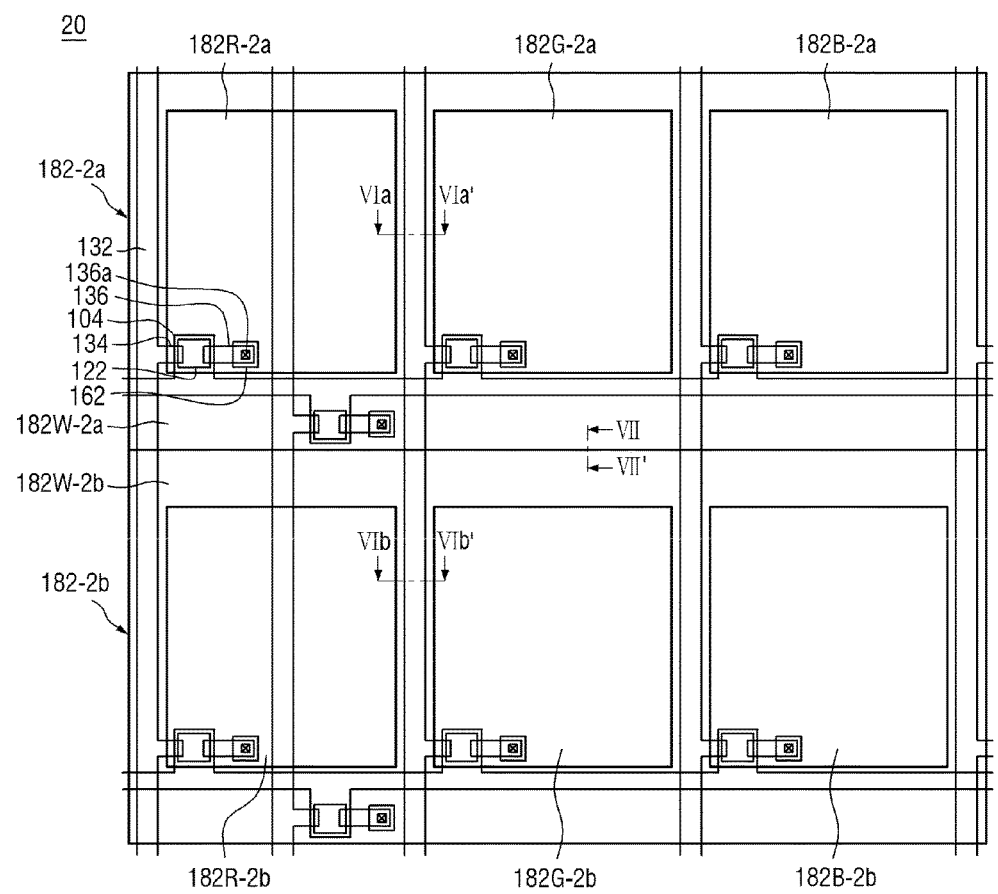
FIG. 5 illustrates a layout view (or plan view) of a pixel in a display device, e.g., a reflective liquid crystal display device, according to an embodiment.
Figure 6A:
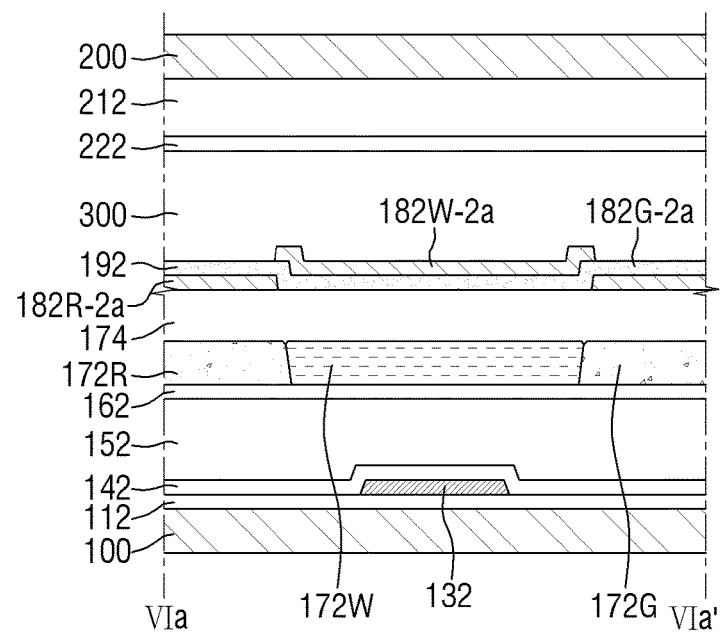
FIG. 6A and FIG. 6B illustrates cross-sectional views taken along lines VIa-VIa' and VIb-VIb' of FIG. 5.
Figure 6B:
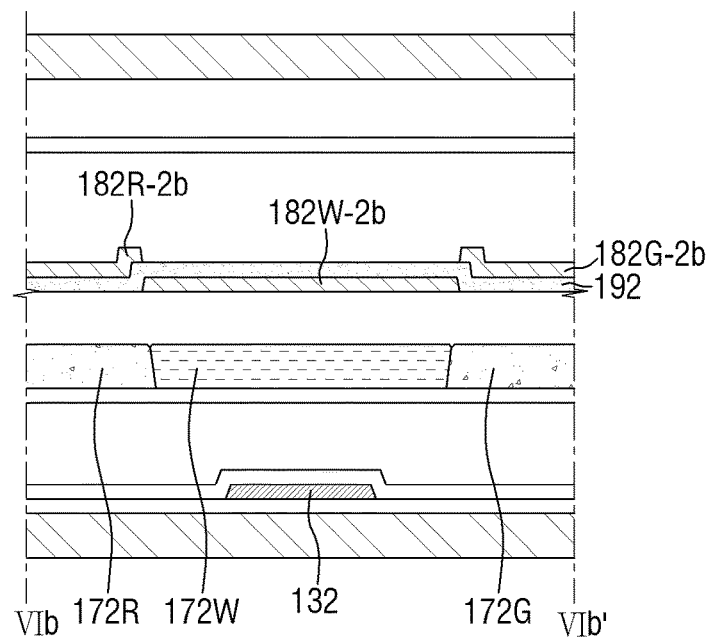
Figure 7:
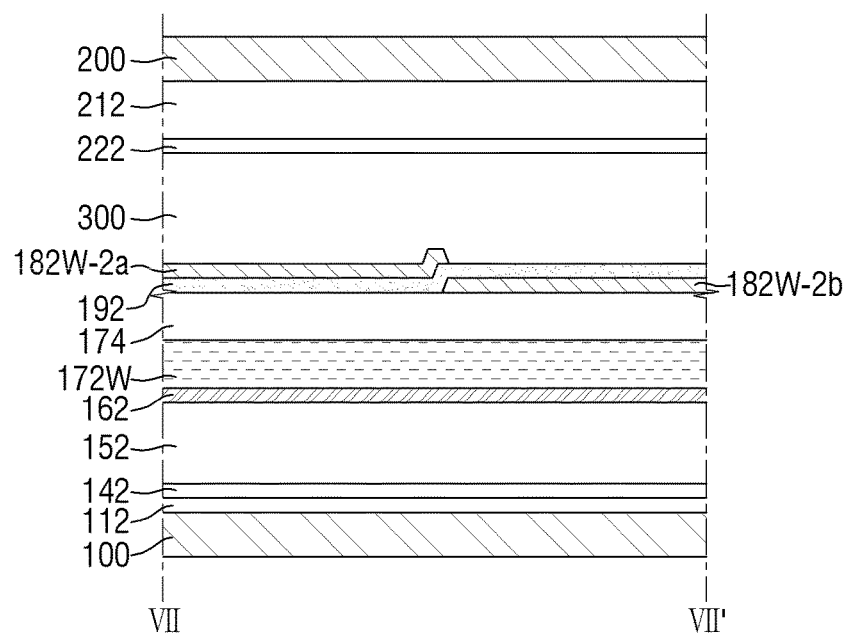
FIG. 7 illustrates a cross-sectional view taken along the line VII-VII' of FIG. 5.
Figure 8:
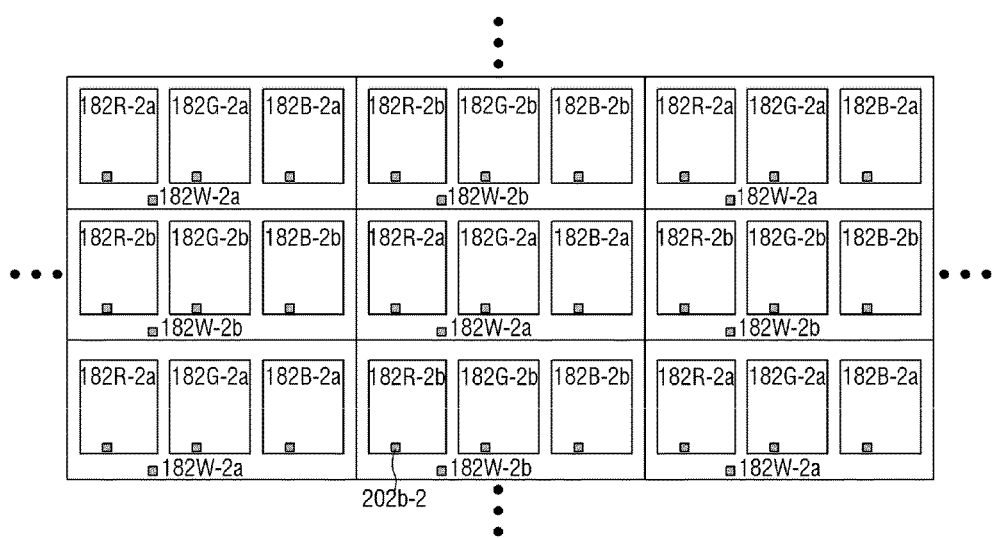
FIG. 8 illustrates a plan view for explaining pixel electrodes and light blocking members in the display device associated with FIG. 5.

FIG. 5 illustrates a layout view of a pixel in a display device, e.g., a reflective liquid crystal display device, according to an embodiment. FIG. 6A and FIG. 6B illustrate cross-sectional views taken along lines VIa-VIa' and VIb-VIb' of FIG. 5. FIG. 7 illustrates a cross-sectional view taken along the line VII-VII' of FIG. 5. FIG. 8 illustrates a plan view for explaining pixel electrodes and light blocking members in the display device associated with FIG. 5.

Referring to FIGS. 5 to 8, the reflective liquid crystal display device 20 has substantially identical or analogous configuration with the reflective liquid crystal display device 10 shown in FIGS. 1 to 4, except for configurations of a first pixel electrode 182-2a and a second pixel electrode 182-2b. Thus, the following description will focus on differences between the reflective liquid crystal display devices 10 and 20.

In the present embodiment, the first pixel electrode 182-2a includes a plurality of sub-pixel electrodes 182R-2a, 182G-2a, 182B-2a and 182W-2a, and the second pixel electrode 182-2b disposed on a previous or following row or column adjacent to the first pixel electrode 182-2a includes a plurality of sub-pixel electrodes 182R-2b, 182G-2b, 182B-2b and 182W-2b.

The first pixel electrode 182-2a includes a first sub-pixel electrode 182R-2a, a second sub-pixel electrode 182G-2a, a third sub-pixel electrode 182B-2a and a fourth sub-pixel electrode 182W-2a.

The first sub-pixel electrode 182R-2a, the second sub-pixel electrode 182G-2a and the third sub-pixel electrode 182B-2a may be disposed within the fourth sub-pixel electrode 182W-2a to be planarly spaced apart from one another. Since the first sub-pixel electrode 182R-2a, the second sub-pixel electrode 182G-2a and the third sub-pixel electrode 182B-2a are spaced apart from one another, they may be electrically insulated from one another.

The fourth sub-pixel electrode 182W-2a may be disposed on a different layer from the first sub-pixel electrode 182R-2a, the second sub-pixel electrode 182G-2a and the third sub-pixel electrode 182B-2a, so that it may be electrically insulated from the first sub-pixel electrode 182R-2a, the second sub-pixel electrode 182G-2a and the third sub-pixel electrode 182B-2a.

Referring to FIG. 6A and FIG. 6B, the first sub-pixel electrode 182R-2a, the second sub-pixel electrode 182G-2a and the third sub-pixel electrode 182B-2a may be disposed under a second passivation layer 192, and the fourth sub-pixel electrode 182W-2a may be disposed on the second passivation layer 192. In this case, the second passivation layer 192 may include an opening, although not shown, for connecting the fourth sub-pixel electrode 182W-2a to a drain electrode 136.

A first sub-pixel electrode side boundary of inner boundaries of the fourth sub-pixel electrode 182W-2a and boundaries of the first sub-pixel electrode 182R-2a may be substantially coincide/overlap with each other, when viewed in a plan view.

Likewise, a second sub-pixel electrode side boundary of the inner boundaries of the fourth sub-pixel electrode 182W-2a and a fourth sub-pixel electrode side boundary of inner boundaries of the second sub-pixel electrode 182G-2a may substantially coincide/overlap with each other, when viewed in the plan view.

Similarly, a third sub-pixel electrode side boundary of the inner boundaries of the fourth sub-pixel electrode 182W-2a and a fourth sub-pixel electrode boundary of the inner boundaries of the third sub-pixel electrode 182B-2a may substantially coincide/overlap with each other, when viewed in the plan view.

The second pixel electrode 182-2b includes a first sub-pixel electrode 182R-2b, a second sub-pixel electrode 182G-2b, a third sub-pixel electrode 182B-2b and a fourth sub-pixel electrode 182W-2b.

The first sub-pixel electrode 182R-2b, the second sub-pixel electrode 182G-2b and the third sub-pixel electrode 182B-2b may be disposed within the fourth sub-pixel electrode 182W-2b to be spaced apart from one another. Since the first sub-pixel electrode 182R-2b, the second sub-pixel electrode 182G-2b and the third sub-pixel electrode 182B-2b are spaced apart from one another, they may be electrically insulated from one another.

The fourth sub-pixel electrode 182W-2b may be disposed on a different layer from the first sub-pixel electrode 182R-2b, the second sub-pixel electrode 182G-2b and the third sub-pixel electrode 182B-2b, so that it may be electrically insulated from the first sub-pixel electrode 182R-2b, the second sub-pixel electrode 182G-2b and the third sub-pixel electrode 182B-2b.

Referring to FIG. 6A and FIG. 6B, the first sub-pixel electrode 182R-2b, the second sub-pixel electrode 182G-2b and the third sub-pixel electrode 182B-2b may be disposed on the second passivation layer 192, and the fourth sub-pixel electrode 182W-2b may be disposed under the second passivation layer 192. In this case, the second passivation layer 192 may include an opening, although not shown, for connecting the first sub-pixel electrode 182R-2b, the second sub-pixel electrode 182G-2b and the third sub-pixel electrode 182B-2b to the drain electrode 136.

A first sub-pixel electrode side boundary of inner boundaries of the fourth sub-pixel electrode 182W-2b and boundaries of the first sub-pixel electrode 182R-2b may be substantially coincide/overlap with each other, when viewed in a plan view.

Likewise, a second sub-pixel electrode side boundary of the inner boundaries of the fourth sub-pixel electrode 182W-2b and boundaries of the second sub-pixel electrode 182G-2b may substantially coincide/overlap with each other, when viewed in the plan view.

Similarly, a third sub-pixel electrode side boundary of the inner boundaries of the fourth sub-pixel electrode 182W-2b and a fourth sub-pixel electrode boundary of the inner boundaries of the third sub-pixel electrode 182B-2b may substantially coincide/overlap with each other, when viewed in the plan view.

Accordingly, although each of the first pixel electrode 182-2a and the second pixel electrode 182-2b includes a plurality of sub-pixel electrodes electrically insulated from one another when viewed in the plan view, the first pixel electrode 182-2a and the second pixel electrode 182-2b may be configured to be continuously arranged when viewed internally.

With this configuration, when viewed in the plan view, since the sub-pixel electrode 182R-2a, 182G-2a, 182B-2a, 182W-2a, 182R-2b, 182G-2b, 182B-2b and 182W-2b are seamlessly arranged even in boundaries between each of the sub-pixel electrodes 182R-2a, 182G-2a, 182B-2a, 182W-2a, 182R-2b, 182G-2b, 182B-2b and 182W-2b, alignment of the liquid crystal molecules can be easily controlled in the boundaries without installing separate light blocking members in the boundaries. Therefore, with this configuration without light blocking members, the aperture ratio can be enhanced, compared to a configuration in which a spacing exists between the sub-pixel electrodes and a light blocking member is installed in the spacing.

In addition, the fourth sub-pixel electrode 182W-2a of the first pixel electrode 182-2a and the fourth sub-pixel electrode 182W-2a of the second pixel electrode 182-2b are disposed on different layers, so that they are electrically insulated from each other.

Referring to FIG. 7, the fourth sub-pixel electrode 182W-2a of the first pixel electrode 182-2a may be disposed on the second passivation layer 192, and the fourth sub-pixel electrode 182W-2b of the second pixel electrode 182-2b may be disposed under the second passivation layer 192, so that the fourth sub-pixel electrode 182W-2a and the fourth sub-pixel electrode 182W-2b may be electrically insulated from each other.

A second pixel electrode side boundary of outer boundaries of the fourth sub-pixel electrode 182W-2a of the first pixel electrode 182-2a and a first pixel electrode side boundary of outer boundaries of the fourth sub-pixel electrode 182W-2b of the second pixel electrode 182-2b may substantially coincide/overlap with each other, when viewed in a plan view.

Accordingly, the first pixel electrode 182-2a and the second pixel electrode 182-2b may be configured to be continuously arranged without a spacing therebetween, when viewed in the plan view.

With this configuration, when viewed in the plan view, since the fourth sub-pixel electrodes 182W-2a and 182W-2b are seamlessly disposed even in boundaries between the pixel electrodes, alignment of the liquid crystal molecules can be easily controlled in the boundaries even without separately installing light blocking members in the boundaries. Therefore, with this configuration without light blocking members, the aperture ratio can be enhanced, compared to a configuration in which a spacing exists between the pixel electrodes and a light blocking member is disposed in the spacing.

Referring to FIG. 8, in some embodiments, since it is not easy to control a voltage applied to liquid crystal molecules positioned in a contact hole 136a, the second light blocking member 202b-2 may be disposed at a position corresponding to the contact hole 136a.

Figure 9:
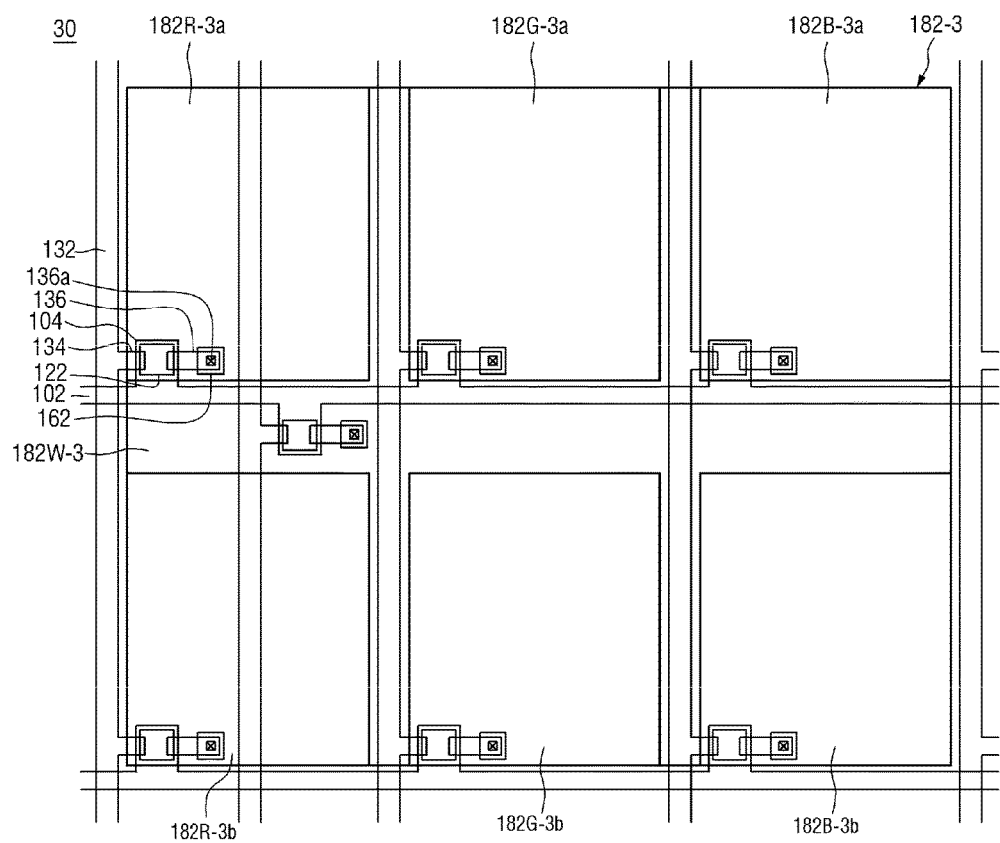
Figure 10:
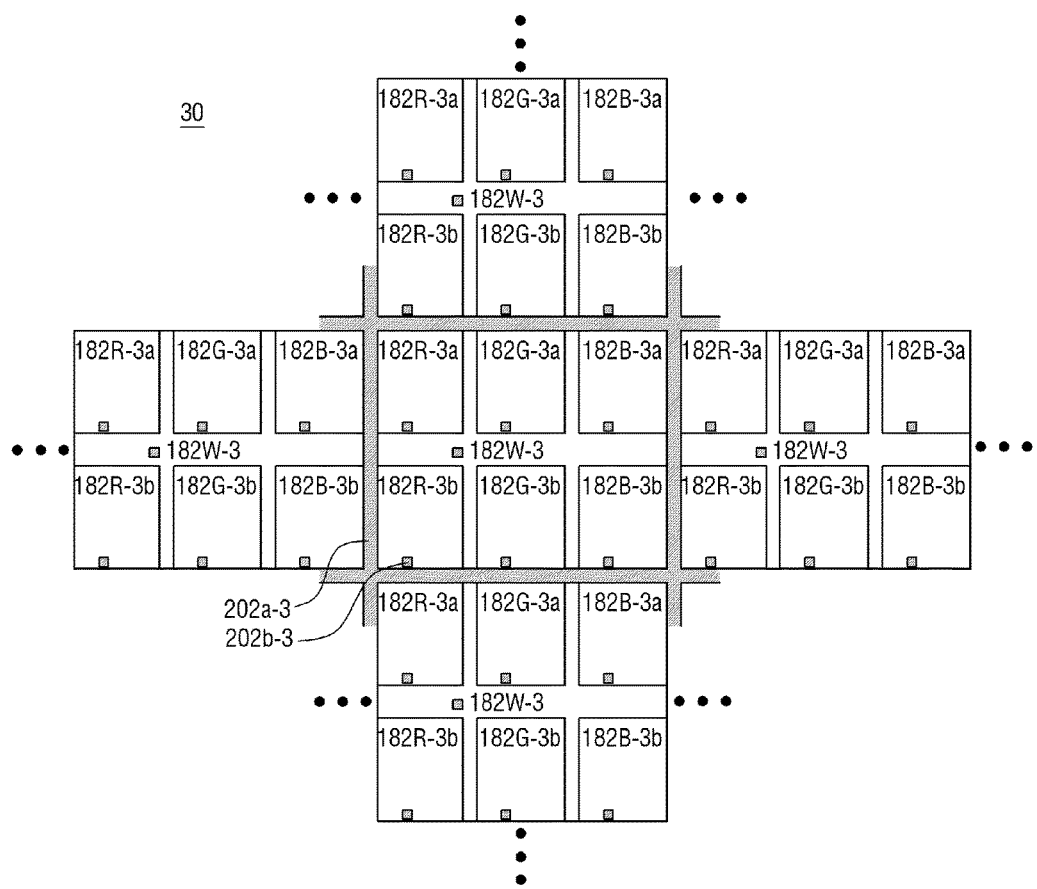

FIG. 9 is a layout view of a pixel a reflective liquid crystal display device, and FIG. 10 is a plan views for explaining an array of a pixel electrode and light blocking members in the reflective liquid crystal display device shown in FIG. 9.

Referring to FIGS. 9 and 10, the reflective liquid crystal display device 30 has substantially identical or analogous configuration with the reflective liquid crystal display device 10 shown in FIGS. 1 to 4, except for a configuration of a pixel electrode 182-3. Thus, the following description will focus on differences between the reflective liquid crystal display devices 10 and 30.

In the present embodiment, the pixel electrode 182-3 includes a first sub-pixel electrode 182R-3a, a second sub-pixel electrode 182G-3a, a third sub-pixel electrode 182B-3a, a fourth sub-pixel electrode 182R-3b, a fifth sub-pixel electrode 182G-3b, a sixth sub-pixel electrode 182B-3b and a seventh sub-pixel electrode 182W-3.

The first sub-pixel electrode 182R-3a and the fourth sub-pixel electrode 182R-3b may be disposed to correspond to color filters of the same color, the second sub-pixel electrode 182G-3a and the fifth sub-pixel electrode 182G-3b may be disposed to correspond to color filters of the same color, and the third sub-pixel electrode 182B-3a and the sixth sub-pixel electrode 182B-3b may be disposed to correspond to color filters of the same color.

The plurality of sub-pixel electrode 182R-3a, 182R-3b, 182G-3a, 182G-3b, 182B-3a, and 182B-3b, except for the fourth sub-pixel electrode 182W-3, may be disposed on the same layer so as to be spaced apart from each other.

The first sub-pixel electrode 182R-3a and the fourth sub-pixel electrode 182R-3b may be disposed to be spaced a predetermined distance apart from each other in a column direction (e.g., in a vertical direction in the drawing), and the second sub-pixel electrode 182G-3a and the fifth sub-pixel electrode 182G-3b may be disposed to be spaced a predetermined distance apart from each other in the column direction (e.g., in the vertical direction in the drawing). The second sub-pixel electrode 182B-3a and the sixth sub-pixel electrode 182B-3b may be disposed to be spaced a predetermined distance apart from each other in the column direction (e.g., in the vertical direction in the drawing).

The first sub-pixel electrode 182R-3a, the second sub-pixel electrode 182G-3a and the third sub-pixel electrode 182B-3a may be disposed in a row in turn. Here, the first sub-pixel electrode 182R-3a and the second sub-pixel electrode 182G-3a may be disposed to be spaced a predetermined distance apart from each other in a row direction (e.g., in a horizontal direction in the drawing). Likewise, the second sub-pixel electrode 182G-3a and the third sub-pixel electrode 182B-3a may be disposed to be spaced a predetermined distance apart from each other in a row direction (e.g., in the horizontal direction in the drawing).

The fourth sub-pixel electrode 182R-3b, the fifth sub-pixel electrode 182G-3b and the sixth sub-pixel electrode 182B-3b may be disposed in a row in turn. Here, the fourth sub-pixel electrode 182R-3b and the fifth sub-pixel electrode 182G-3b may be disposed to be spaced a predetermined distance apart from each other in a row direction (e.g., in a horizontal direction in the drawing). Likewise, the fifth sub-pixel electrode 182G-3b and the sixth sub-pixel electrode 182B-3b may be disposed to be spaced a predetermined distance apart from each other in the row direction (e.g., in the horizontal direction in the drawing).

The seventh sub-pixel electrode 182W-3 may be formed in a single body to be disposed in a column-direction spacing between the first sub-pixel electrode 182R-3a and the fourth sub-pixel electrode 182R-3b, in a column-direction spacing between the second sub-pixel electrode 182G-3a and the fifth sub-pixel electrode 182G-3b, in a column-direction spacing between the third sub-pixel electrode 182B-3a and the sixth sub-pixel electrode 182B-3b, in row-direction spacings between each of the first sub-pixel electrode 182R-3a, the second sub-pixel electrode 182G-3a and the third sub-pixel electrode 182B-3a, and in row-direction spacings between each of the fourth sub-pixel electrode 182R-3b, the fifth sub-pixel electrode 182G-3b and the sixth sub-pixel electrode 182B-3b.

The seventh sub-pixel electrode 182W-3 may be disposed on a different layer from the plurality of sub-pixel electrodes 182R-3a, 182R-3b, 182G-3a, 182G-3b, 182B-3a and 182B-3b, so that it may be electrically insulated from the plurality of sub-pixel electrodes 182R-3a, 182R-3b, 182G-3a, 182G-3b, 182B-3a and 182B-3b.

A first sub-pixel electrode side boundary of boundaries of the seventh sub-pixel electrode 182W-3 and a seventh sub-pixel electrode side boundary of boundaries of the first sub-pixel electrode 182R-3a may substantially coincide/overlap with each other, when viewed in a plan view.

Boundary relationships between the seventh sub-pixel electrode 182W-3 and each of other sub-pixel electrode 182R-3b, 182G-3a, 182G-3b, 182B-3a and 182B-3b may be substantially identical or analogous to the boundary relationship between the seventh sub-pixel electrode 182W-4ab and the first sub-pixel electrode 182R-4a, as described above.

In some embodiments, the pixel electrodes 182-3 may be repeatedly disposed to be spaced a predetermined distance apart from each other throughout a plurality of rows and columns, as shown in FIG. 10.

The light blocking members 202a and 202b may include a first light blocking member 202a-3 disposed in a spacing between the pixel electrodes 182-3. In some embodiments, since it is not easy to control a voltage applied to liquid crystal molecules positioned in a contact hole 136a, the second light blocking member 202b-3 may be disposed at a position corresponding to the contact hole 136a.

Figure 11:
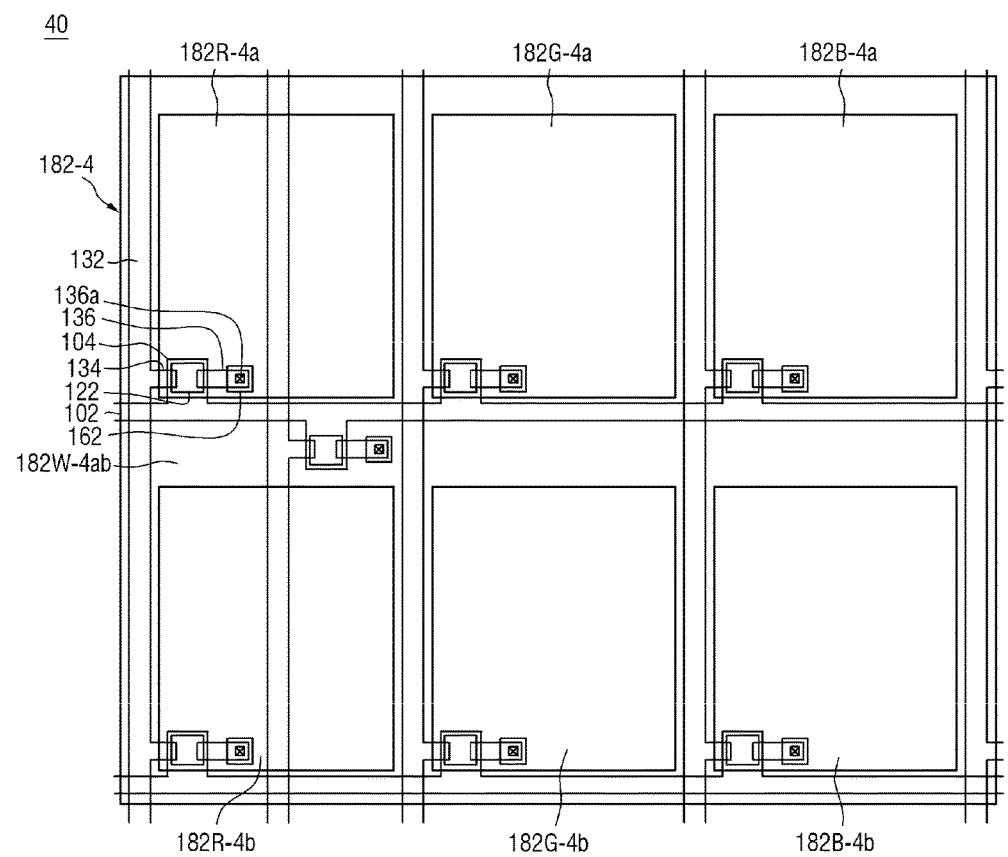
Figure 12:
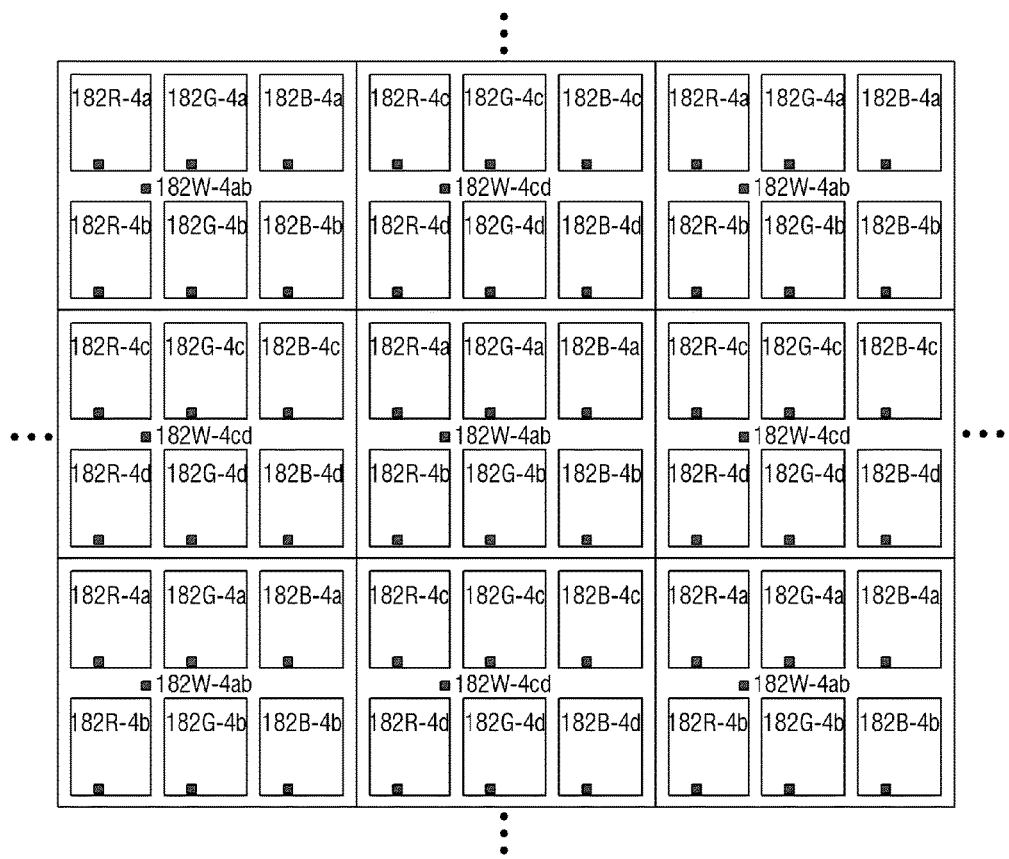

FIG. 11 is a layout view of a pixel in a reflective liquid crystal display device, and FIG. 12 is a plan view for explaining an array of a pixel electrode and light blocking members in the reflective liquid crystal display device shown in FIG. 11.

Referring to FIGS. 11 and 12, the reflective liquid crystal display device 40 has substantially identical or analogous configuration with the reflective liquid crystal display device 20 shown in FIGS. 5 to 8 or the reflective liquid crystal display device 30 shown in FIGS. 9 to 10, except for a configuration of pixel electrodes 182-4. Thus, the following description will focus on differences between the previous and present inventions.

In the present embodiment, the pixel electrodes 182-4 include a first sub-pixel electrode 182R-4a, a second sub-pixel electrode 182G-4a, a third sub-pixel electrode 182B-4a, a fourth sub-pixel electrode 182R-4b, a fifth sub-pixel electrode 182G-4b, a sixth sub-pixel electrode 182B-4b and a seventh sub-pixel electrode 182W-4ab.

In view of a configuration of one of the pixel electrodes 182-4, the reflective liquid crystal display device 40 according to the present embodiment shown in FIGS. 11 and 12 is substantially identical or analogous with the reflective liquid crystal display device 30 shown in FIGS. 9 and 10, except that a plurality of sub-pixel electrodes 182R-4a, 182G-4a, 182B-4a, 182R-4b, 182G-4b and 182B-4b are disposed within the seventh sub-pixel electrode 182W-4ab.

A first sub-pixel electrode side boundary of inner boundaries of the seventh sub-pixel electrode 182W-4ab and a boundary of the first sub-pixel electrode 182R-4a may substantially coincide/overlap with each other, when viewed in a plan view.

Boundary relationships between the seventh sub-pixel electrode 182W-4ab and each of other sub-pixel electrode 182G-4a, 182B-4a, 182R-4b, 182G-4b and 182B-4b may be substantially identical or analogous to that between the seventh sub-pixel electrode 182W-4ab and the first sub-pixel electrode 182R-4a, as described above.

An arrangement relationship between the pixel electrodes of the reflective liquid crystal display device 40 according to the present embodiment may be substantially identical or analogous to that between the pixel electrodes of the reflective liquid crystal display device 20 shown in FIGS. 5 and 8.

Referring to FIG. 12, the seventh sub-pixel electrode 182W-4ab of a first pixel electrode and the seventh sub-pixel electrode 182W-4cd of a second pixel electrode may be disposed on different layers, so that they are electrically insulated from each other.

A second pixel electrode side boundary of outer boundaries of the seventh sub-pixel electrode of the first pixel electrode and a first pixel electrode side boundary of outer boundaries of the seventh sub-pixel electrode 182W-4cd of the second pixel electrode may substantially coincide/overlap with each other, when viewed in a plan view.

Accordingly, the first pixel electrode and the second pixel electrode may be configured to be continuously arranged without a spacing therebetween, when viewed in the plan view.

Figure 13:
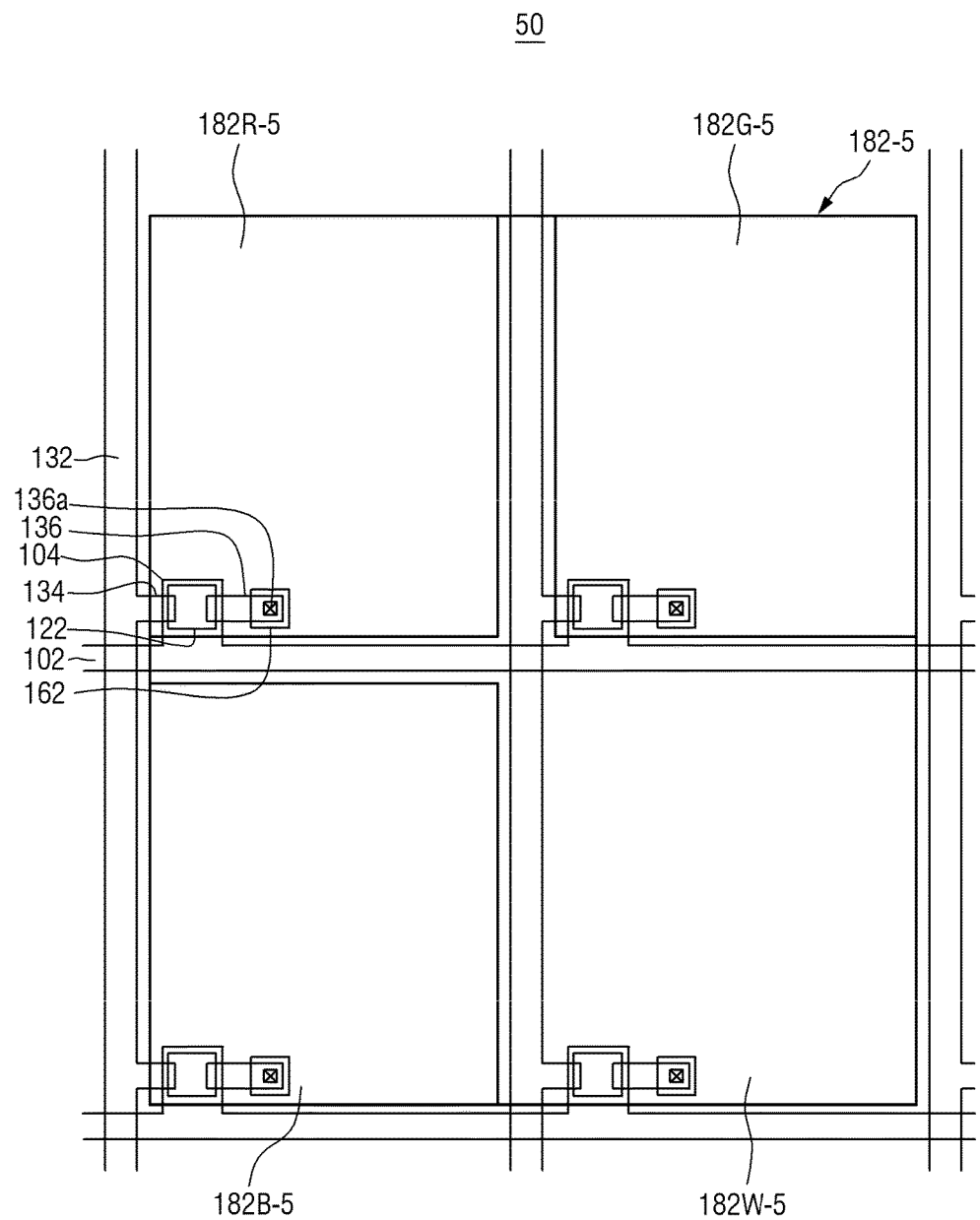
Figure 14:
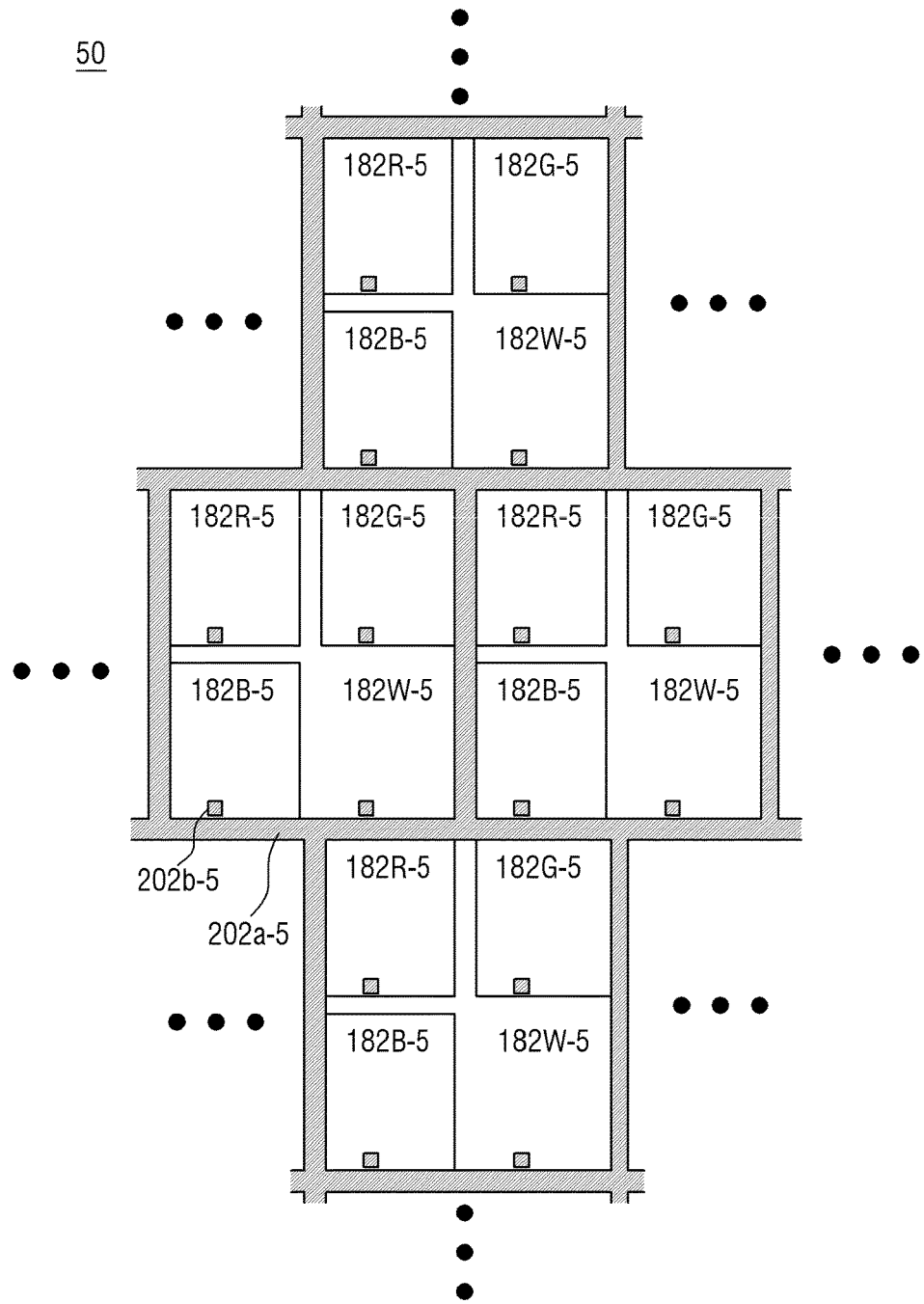

FIG. 13 is a layout view of a pixel a reflective liquid crystal display device, and FIG. 14 is a plan views for explaining an array of a pixel electrode and light blocking members in the reflective liquid crystal display device shown in FIG. 13.

Referring to FIGS. 13 and 14, the reflective liquid crystal display device 50 has substantially identical or analogous configuration with the reflective liquid crystal display device 10 shown in FIGS. 1 to 4, except for a configuration of a pixel electrode 182-5. Thus, the following description will focus on differences between the previous and present embodiments.

In the present embodiment, the pixel electrode 182-5 may include a first sub-pixel electrode 182R-5, a second sub-pixel electrode 182G-5, a third sub-pixel electrode 182B-5 and a fourth sub-pixel electrode 182W-5.

The first sub-pixel electrode 182R-5, the second sub-pixel electrode 182G-5 and the third sub-pixel electrode 182B-5 may be spaced apart from one another. The first sub-pixel electrode 182R-5 and the second sub-pixel electrode 182G-5 may be spaced apart from each other in a row direction (e.g., in the horizontal direction in the drawing), and the first sub-pixel electrode 182R-5 and the third sub-pixel electrode 182B-5 may be spaced apart from each other in a column direction (e.g., in a vertical direction in the drawing).

The fourth sub-pixel electrode 182W-5 may be formed in a single body to be disposed in a column-direction spacing between the first sub-pixel electrode 182R-5 and the second sub-pixel electrode 182G-5 and in a column-direction spacing between the first sub-pixel electrode 182R-5 and the third sub-pixel electrode 182B-5.

The fourth sub-pixel electrode 182W-5 may be disposed on a different layer from the plurality of sub-pixel electrodes 182R-5, 182G-5 and 182B-5, so that it may be electrically insulated from the plurality of sub-pixel electrodes 182R-5, 182G-5 and 182B-5.

A first sub-pixel electrode side boundary of boundaries of the fourth sub-pixel electrode 182W-5 and a fourth sub-pixel electrode side boundary of boundaries of the first sub-pixel electrode 182R-5 may substantially coincide/overlap with each other, when viewed in a plan view.

Boundary relationships between the fourth sub-pixel electrode 182W-3 and each of the sub-pixel electrodes 182R-5, 182G-5 and 182B-5 may be substantially identical or analogous to that between the fourth sub-pixel electrode 182W-5 and the first sub-pixel electrode 182R-5, as described above.

In some embodiments, the pixel electrodes 182-5 may be repeatedly disposed to be spaced a predetermined distance apart from each other throughout a plurality of rows and columns, as shown in FIG. 14. Here, the pixel electrodes 182-5 may be alternately disposed between pixel electrodes adjacent in a column direction, but embodiments are not limited thereto.

A light blocking member (202a-5, 202b-5) may include a first light blocking member 202a-5 disposed in a spacing between pixel electrodes. In some embodiments, since it is not easy to control a voltage applied to liquid crystal molecules positioned in a contact hole 136a, the light blocking member (202a-5, 202b-5) may also include a second light blocking member 202b-5 disposed at a position corresponding to the contact hole 136a.

Figure 15:
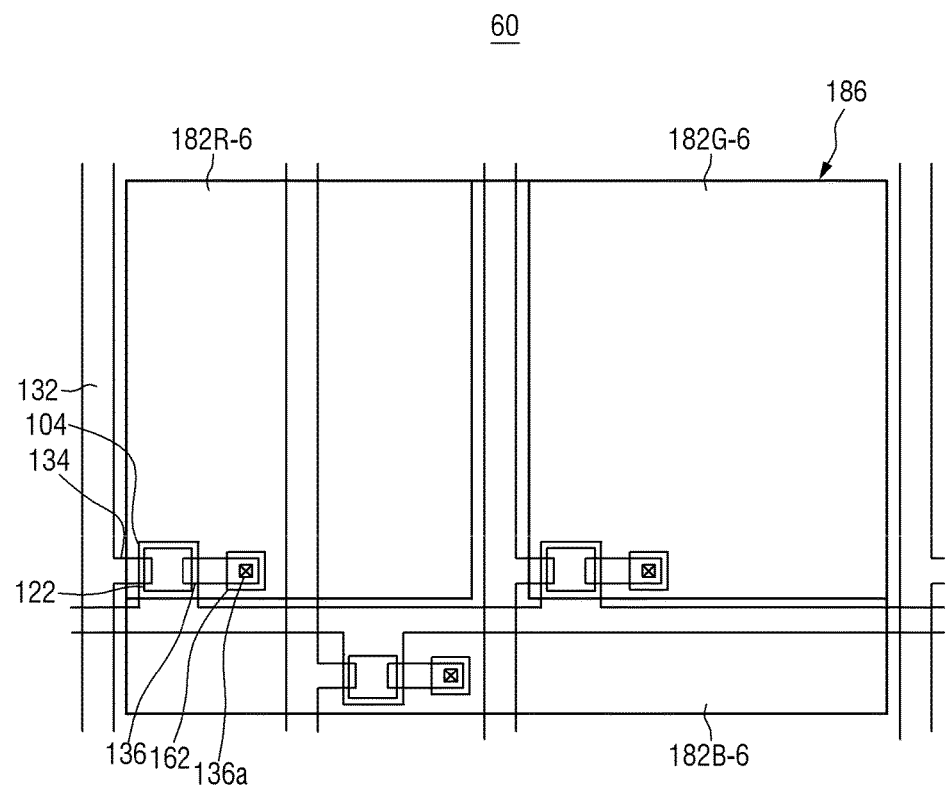
Figure 16:
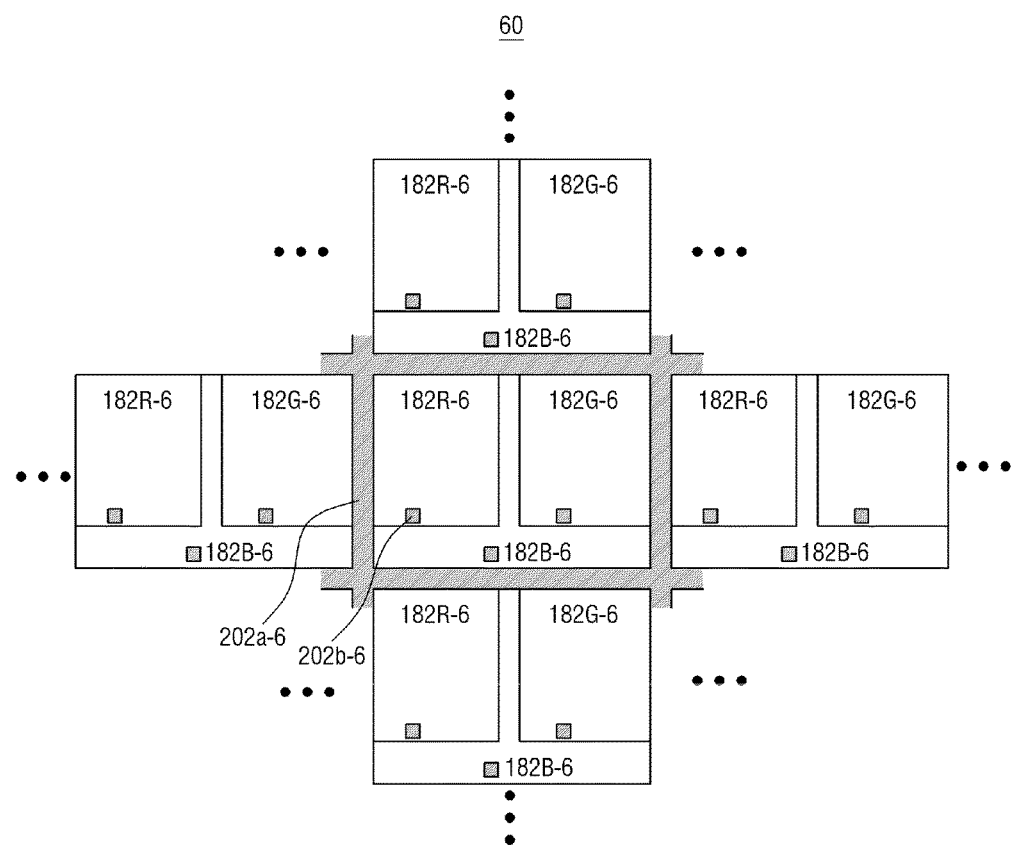

FIG. 15 is a layout view of a pixel a reflective liquid crystal display device, and FIG. 16 is a plan views for explaining an array of a pixel electrode and light blocking members in the reflective liquid crystal display device shown in FIG. 15.

Referring to FIGS. 15 and 16, the reflective liquid crystal display device 60 has substantially identical or analogous configuration with the reflective liquid crystal display device 10 shown in FIGS. 1 to 4, except for a configuration of a pixel electrode 182-6. Thus, the following description will focus on differences between each of the reflective liquid crystal display devices 10 and 60.

In the present embodiment, the pixel electrode 182-6 includes a first sub-pixel electrode 182R-6, a second sub-pixel electrode 182G-6 and a third sub-pixel electrode 182B-6.

The first sub-pixel electrode 182R-6 and the second sub-pixel electrode 182G-6 may be disposed to be planarly spaced apart from each other. For example, the first sub-pixel electrode 182R-6 and the second sub-pixel electrode 182G-6 may be disposed to be spaced a predetermined distance apart from each other in a row direction (e.g., in a horizontal direction in the drawing).

The third sub-pixel electrode 182B-6 may include a first part corresponding to a portion disposed in a row-direction spacing between the first sub-pixel electrode 182R-6 and the second sub-pixel electrode 182G-6. In addition, the third sub-pixel electrode 182B-6 may also include a second part corresponding to a portion extending in a row direction to one side of each of the first sub-pixel electrode 182R-6 and the second sub-pixel electrode 182G-6. The first part and the second part may be connected to each other to then be implemented in a single body.

The third sub-pixel electrode 182B-6 may be disposed on a different layer from the first sub-pixel electrode 182R-6 and the second sub-pixel electrode 182G-6, so that it may be electrically insulated from the first sub-pixel electrode 182R-6 and the second sub-pixel electrode 182G-6.

A first sub-pixel electrode side boundary of boundaries of the third sub-pixel electrode 182B-6 and a third sub-pixel electrode side boundary of boundaries of the first sub-pixel electrode 182R-6 may substantially coincide/overlap with each other.

A second sub-pixel electrode side boundary of boundaries of the third sub-pixel electrode 182B-6 and a third sub-pixel electrode side boundary of boundaries of the second sub-pixel electrode 182G-6 may substantially coincide/overlap with each other.

In some embodiments, the pixel electrodes 182-6 may be repeatedly disposed to be spaced a predetermined distance apart from each other throughout a plurality of rows and columns, as shown in FIG. 16.

A light blocking member (202a, 202b) may include a first light blocking member 202a-6 disposed in a spacing between the pixel electrodes 182. In some embodiments, since it is not easy to control a voltage applied to liquid crystal molecules positioned in a contact hole 136a, the light blocking member (202a, 202b) may also include a second light blocking member 202b-6 disposed at a position corresponding to the contact hole 136a.

Figure 17:
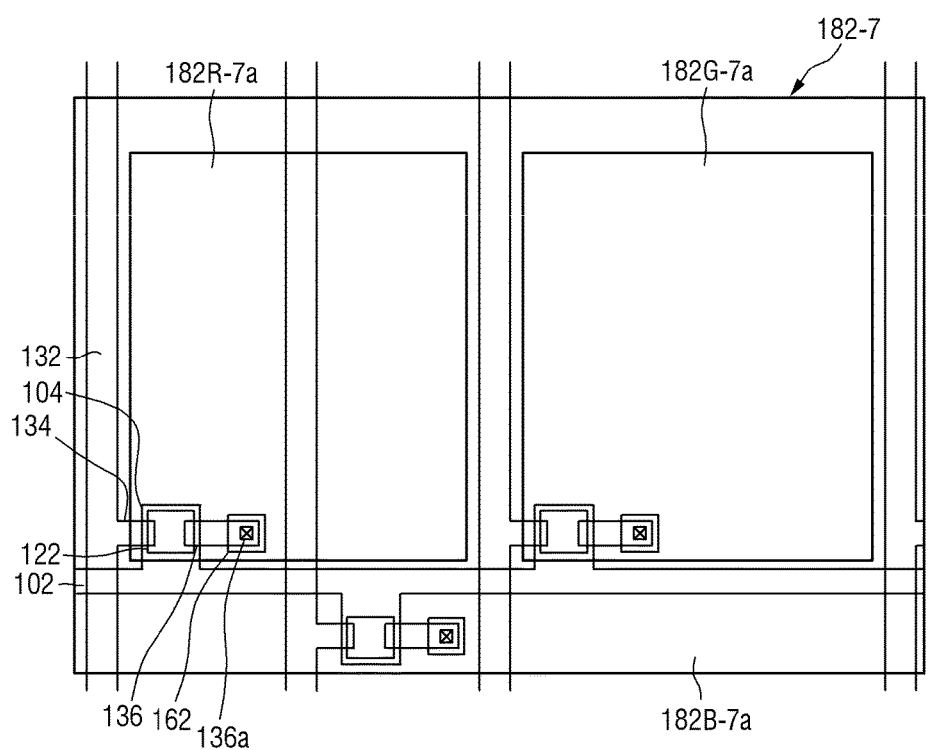
FIG. 17 illustrates a layout view (or plan view) of a pixel in a display device, e.g., a reflective liquid crystal display device, according to some embodiments.
Figure 18:
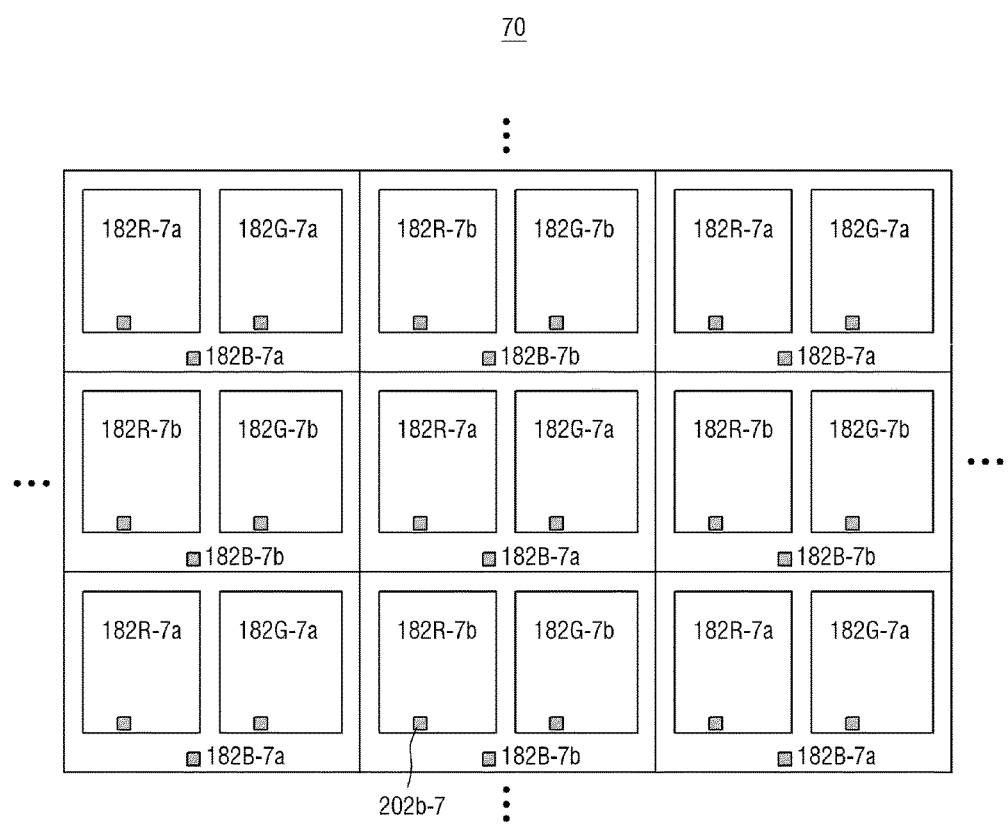
FIG. 18 illustrates a plan view for explaining pixel electrodes and light blocking members in a display device, e.g., a reflective liquid crystal display device, according to some embodiments.

FIG. 17 is a layout view of a pixel a reflective liquid crystal display device, and FIG. 18 is a plan views for explaining an array of a pixel electrode and light blocking members in the reflective liquid crystal display device shown in FIG. 17.

Referring to FIGS. 17 and 18, the reflective liquid crystal display device 70 has substantially identical or analogous configuration with the reflective liquid crystal display device 60 shown in FIGS. 15 and 16, except for a configuration of a pixel electrode 182-7a. Thus, the following description will focus on differences between the reflective liquid crystal display devices 60 and 70.

In the present embodiment, the pixel electrode 182-7a includes a first sub-pixel electrode 182R-7a, a second sub-pixel electrode 182G-7a and a third sub-pixel electrode 182B-7a.

In view of In view of a configuration of one of the pixel electrodes 182-7a, the reflective liquid crystal display device 70 shown in FIGS. 17 and 18 is substantially identical or analogous to the reflective liquid crystal display device 60 shown in FIGS. 15 and 16, except that a first sub-pixel electrode 182R-7a and a second sub-pixel electrode 182G-7a are disposed within a third sub-pixel electrode 182B-7a.

A first sub-pixel electrode side boundary of inner boundaries of the fourth sub-pixel electrode 182B-7a and boundaries of the first sub-pixel electrode 182R-7a may be substantially coincide/overlap with each other, when viewed in a plan view.

A second sub-pixel electrode side boundary of inner boundaries of the fourth sub-pixel electrode 182B-7a and boundaries of the second sub-pixel electrode 182G-7a may be substantially coincide/overlap with each other, when viewed in a plan view.

An arrangement relationship between the pixel electrodes of the reflective liquid crystal display device 70 according to the present embodiment may be substantially identical or analogous to that between the pixel electrodes of the reflective liquid crystal display device 20 shown in FIGS. 5 and 8.

Referring to FIG. 18, the third sub-pixel electrode 182B-7a of a first pixel electrode and the third sub-pixel electrode 182B-7b of a second pixel electrode are disposed on different layers, so that they are electrically insulated from each other.

A first sub-pixel electrode side boundary of inner boundaries of the fourth sub-pixel electrode 182B-7a and boundaries of the first sub-pixel electrode 182R-7a may be substantially coincide/overlap with each other, when viewed in a plan view.

A second sub-pixel electrode side boundary of inner boundaries of the fourth sub-pixel electrode 182B-7a and boundaries of the second sub-pixel electrode 182G-7a may be substantially coincide/overlap with each other, when viewed in a plan view.

An arrangement relationship between the pixel electrodes of the reflective liquid crystal display device 70 according to the present embodiment may be substantially identical or analogous to that between the pixel electrodes of the reflective liquid crystal display device 20 shown in FIGS. 5 and 8.

Referring to FIG. 18, the third sub-pixel electrode 182B-7a of a first pixel electrode and the third sub-pixel electrode 182B-7b of a second pixel electrode are disposed on different layers, so that they are electrically insulated from each other.

A second pixel electrode side boundary of outer boundaries of the third sub-pixel electrode 182B-7a of the first pixel electrode and a first pixel electrode side boundary of outer boundaries of the third sub-pixel electrode 182B-7b of the second pixel electrode may be substantially coincide/overlap with each other, when viewed in a plan view.

Accordingly, the first pixel electrode and the second pixel electrode may be configured to be continuously arranged without a spacing therebetween, when viewed in the plan view.

According to embodiments, in a display device, the size of a light blocking member may be minimized. Therefore, an aperture ratio associated with the display device may be maximized. In the display device, a portion of a white filter or a blue filter (and a portion of the corresponding sub-pixel electrode) may be positioned between a red filter (and the corresponding sub-pixel electrode) and a green filter (and the corresponding sub-pixel electrode). Therefore, color mixing may be minimized or substantially prevented. Advantageously, satisfactory image quality associated with the display device may be attained.

While embodiments have been particularly described, it will be understood by those of ordinary skill in the art that various changes in form and details may be made therein without departing from the spirit and scope defined by the following claims. The embodiments are illustrative and not restrictive.

What is claimed is:

1. A reflective liquid crystal display device comprising:
a first substrate and a second substrate facing each other and including a plurality of pixels,
a liquid crystal layer interposed between the first substrate and the second substrate, and
a pixel electrode including a first sub-pixel electrode, a second sub-pixel electrode, a third sub-pixel electrode and a fourth sub-pixel electrode disposed in one of the plurality of pixels disposed on the first substrate,
wherein the first sub-pixel electrode, the second sub-pixel electrode and the third sub-pixel electrode are disposed to be planarly spaced apart from one another, the fourth sub-pixel electrode is disposed in a spacing between each of the first sub-pixel electrode, the second sub-pixel electrode and the third sub-pixel electrode, and the fourth sub-pixel electrode is disposed on a different layer from the first sub-pixel electrode, the second sub-pixel electrode and the third sub-pixel electrode.

2. The reflective liquid crystal display device of claim 1, wherein the first sub-pixel electrode, the second sub-pixel electrode and the third sub-pixel electrode are disposed in a row, and the fourth sub-pixel electrode includes a first part disposed in a row-direction spacing between the first sub-pixel electrode and the second sub-pixel electrode and a second part disposed in a row-direction spacing between the second sub-pixel electrode and the third sub-pixel electrode.

3. The reflective liquid crystal display device of claim 1, wherein when viewed in a plan view, a first sub-pixel electrode side boundary of boundaries of the fourth sub-pixel electrode and a fourth sub-pixel electrode side boundary of boundaries of the first sub-pixel electrode substantially coincide with each other, a second sub-pixel electrode side boundary of the boundaries of the fourth sub-pixel electrode and a fourth sub-pixel electrode side boundary of the boundaries of the second sub-pixel electrode substantially coincide with each other, and a third sub-pixel electrode side boundary of the boundaries of the fourth sub-pixel electrode and a fourth sub-pixel electrode boundary of the boundaries of the third sub-pixel electrode substantially coincide with each other.

4. The reflective liquid crystal display device of claim 1, wherein the pixel electrode are repeatedly disposed to be spaced a predetermined distance apart from one another throughout a plurality of rows and columns, and the reflective liquid crystal display device further comprises light blocking patterns disposed in spacings between each of the pixel electrodes.

5. The reflective liquid crystal display device of claim 4, further comprising a red color filter, a green color filter, a blue color filter and white color filter disposed to overlap with the first sub-pixel electrode, the second sub-pixel electrode, the third sub-pixel electrode and the fourth sub-pixel electrode, respectively, and the white color filter is disposed to overlap with the fourth sub-pixel electrode.

6. The reflective liquid crystal display device of claim 1, wherein the first sub-pixel electrode, the second sub-pixel electrode and the third sub-pixel electrode and the pixel electrode are rectangular in a plan view.

7. The reflective liquid crystal display device of claim 1, wherein the first sub-pixel electrode, the second sub-pixel electrode and the third sub-pixel electrode are disposed on the same layer.

8. A reflective liquid crystal display device comprising:
a first substrate and a second substrate facing each other and including a plurality of pixels,
a liquid crystal layer interposed between the first substrate and the second substrate, and
a first pixel electrode including a first sub-pixel electrode, a second sub-pixel electrode, a third sub-pixel electrode and a fourth sub-pixel electrode disposed in one of the plurality of pixels disposed on the first substrate,
wherein the first sub-pixel electrode, the second sub-pixel electrode and the third sub-pixel electrode are disposed to be planarly spaced apart from one another, and the fourth sub-pixel electrode is disposed on a different layer from the first sub-pixel electrode, the second sub-pixel electrode and the third sub-pixel electrode.

9. The reflective liquid crystal display device of claim 8, wherein when viewed in a plan view, a first sub-pixel electrode side boundary of inner boundaries of the fourth sub-pixel electrode and boundaries of the first sub-pixel electrode substantially coincide with each other, a second sub-pixel electrode side boundary of the inner boundaries of the fourth sub-pixel electrode and boundaries of the second sub-pixel electrode substantially coincide with each other, and a third sub-pixel electrode side boundary of the inner boundaries of the fourth sub-pixel electrode and boundaries of the third sub-pixel electrode substantially coincide with each other.

10. The reflective liquid crystal display device of claim 8, further comprising a second pixel electrode disposed on a previous or following row or column adjacent to the first pixel electrode, wherein the second pixel electrode includes a fifth sub-pixel electrode, a sixth sub-pixel electrode, a seventh sub-pixel electrode and a eighth sub-pixel electrode, the fifth sub-pixel electrode, the sixth sub-pixel electrode and the seventh sub-pixel electrode are disposed to be spaced apart from one another within the eighth sub-pixel electrode, the eighth sub-pixel electrode is disposed on a different layer from the fifth sub-pixel electrode, the sixth sub-pixel electrode and the seventh sub-pixel electrode, and the fourth sub-pixel electrode and the eighth sub-pixel electrode are disposed on different layers.

11. The reflective liquid crystal display device of claim 10, wherein a second sub-pixel electrode side boundary of outer boundaries of the first sub-pixel electrode and a first pixel electrode side boundary of outer boundaries of the second pixel electrode substantially coincide with each other in a plan view.

12. The reflective liquid crystal display device of claim 10, wherein the fourth sub-pixel electrode is disposed on the same layer with the fifth sub-pixel electrode, the sixth sub-pixel electrode and the seventh sub-pixel electrode, and the eighth sub-pixel electrode is disposed on the same layer with the first sub-pixel electrode, the second sub-pixel electrode and the third sub-pixel electrode.

13. The reflective liquid crystal display device of claim 8, further comprising a red color filter, a green color filter, a blue color filter and white color filter disposed to overlap with the first sub-pixel electrode, the second sub-pixel electrode, the third sub-pixel electrode and fourth sub-pixel electrode, respectively, and the white color filter is disposed to overlap with the fourth sub-pixel electrode.

14. The reflective liquid crystal display device of claim 8, wherein the first sub-pixel electrode, the second sub-pixel electrode and the third sub-pixel electrode and the first pixel electrode are rectangular in a plan view.

\* \* \* \* \*